United States Patent [19]
Birch et al.

[11] Patent Number: 5,493,339
[45] Date of Patent: Feb. 20, 1996

[54] SYSTEM AND METHOD FOR TRANSMITTING A PLURALITY OF DIGITAL SERVICES INCLUDING COMPRESSED IMAGING SERVICES AND ASSOCIATED ANCILLARY DATA SERVICES

[75] Inventors: Christopher H. Birch, Toronto, Canada; Guy A. Primiano, Dunwoody; Ajith N. Nair, Lawrenceville, both of Ga.

[73] Assignee: Scientific-Atlanta, Inc., Norcross, Ga.

[21] Appl. No.: 160,828

[22] Filed: Dec. 3, 1993

Related U.S. Application Data

[63] Continuation-in-part of Ser. No. 6,476, Jan. 20, 1993.

[51] Int. Cl.$^6$ ................................................. H04N 7/025
[52] U.S. Cl. ......................... 348/461; 348/465; 348/467; 348/468; 348/478
[58] Field of Search ................................... 348/461, 465, 348/467, 468, 473, 474, 476, 477, 478, 506

[56] References Cited

U.S. PATENT DOCUMENTS

| | | | |
|---|---|---|---|
| 4,652,903 | 3/1987 | Lucas | 358/11 |
| 4,697,277 | 9/1987 | van Rassel | 375/116 |
| 4,817,142 | 3/1989 | van Rassel | 380/15 |
| 4,829,569 | 5/1989 | Seth-Smith et al. | 380/10 |
| 4,866,770 | 9/1989 | Seth-Smith et al. | 380/20 |
| 4,890,321 | 12/1989 | Seth-Smith et al. | 380/20 |
| 5,200,823 | 4/1993 | Yoneda et al. | 358/146 |
| 5,319,707 | 6/1994 | Wasilewski et al. | |
| 5,400,401 | 3/1995 | Wasilewski et al. | |

OTHER PUBLICATIONS

Paper entitled "ISO 11172-3 Compatible Low Bit Rate Multi-Channel Audio Coding System and Conventional Stereo Coding at Lower Sampling Frequencies", International Organization for Standardization, Organisation Internationale de Normalisation, Third Working Draft of MPEG-2 Audio Subgroup dated Aug. 23, 1993.
Paper entitled "Agreement on Profile/Level", International Organization for Standardization, Organisation Internationale de Normalisation, dated Jul. 16, 1993.
Table 3–B.1 titled Possible quantization per subband, Layer II—annex to first working draft of MPEG-2 Audio Subgroup dated Aug. 23, 1993.
Annex C (informative), Adaptive Multi-Channel Prediction, (undated).
Paper entitled "Test Model 5", International Organisation for Standardisation, Organisation Internationale de Normalisation dated Apr. 1993, Version 2, document AVC–491b.
Paper entitled "MPEG-2 Systems Working Draft", International Organization for Standardization, Organisation Internationale de Normalisation dated Jul. 1993.
Data Net, *Electronic News*, Oct. 18, 1993, p. 20.

(List continued on next page.)

*Primary Examiner*—Victor R. Kostak
*Assistant Examiner*—Nathan J. Flynn
*Attorney, Agent, or Firm*—Banner & Allegretti, Ltd.

[57] ABSTRACT

A video system for processing compressed video data into composite video data, the composite video data corresponding to a standard composite video signal type selected from a plurality of standard types, the plurality of standard types including at least one of an NTSC composite video signal type and a PAL video signal type, includes a processor, a standard video decompressor and a video interface. The standard video decompressor processes the compressed video data into decompressed video data and user data, the user data having VBI data encoded therein. The processor culls the VBI data from the user data. The video interface processes the decompressed video data and the VBI data into the composite video data with the VBI data encoded therein. The video interface includes a VBI data generator to process the VBI data into VBI signal data, a mixer coupled to the video decompressor to receive the decompressed video data, the mixer being coupled to the VBI data generator to receive the VBI signal data the mixer providing output Y, U and V data during an active portion of a scan line, and circuitry to process the Y, U and V data into the composite video data.

20 Claims, 16 Drawing Sheets

OTHER PUBLICATIONS

"GI, Motorola Concocting 'MPEG–lite'", *Electronic News*, vol. 30, No. 1978, Aug. 30, 1993.

"Zenith, LSI Set Digital Decoder Deal", *Electronic News*, Nov. 22, 1993.

SMPTE Standard for Television—Component Video Signal 4:2:2—Bit–Parallel Digital Interface, The Society of Motion Picture and Television Engineers, Jul. 16, 1992.

American National Standard for television—time and control code—video and audio tape for 525–line/60–field systems, Society of Motion Picture and Television Engineers, Jan. 29, 1986, ANSI/SMPTE 12M–1986.

Klaus Johannsen, "Automatic Transmitter Identification System", *IEEE Transactions on Broadcasting*, vol. 38, No. 2, Jun. 1992.

Paper entitled "SAA 7189 Digital Video Encoder", Philips Semiconductors, Apr. 2, 1993.

Preliminary Technical Manual for L64112 Digital TV MPEG Decoder, LSI Logic, Apr. 16, 1993.

Television Captioning for the Deaf, Signal and Display Specifications, Report No. E–7709–C, PBS Engineering and Technical Operations, May 1980.

"General Instrument Fans DigiCipher/MPEG Rivalry", *Electronic News*, vol. 39, No. 1977, Aug. 23, 1993.

LSI Logic memorandum from Ron Glibbery to Randy Munich dated Sep. 13, 1993 regarding '112 register changes in the L64112 Digital TV MPEG Decoder, 19 pages.

Paper entitled "Syntax Proposal for MPEG–2 Transport Stream Program Specific Information", International Organization for Standardization, Organisation Internationale de Normalisation, ISO/IEC JTC1/SC29, WG11, MPEG 93, dated Jul., 1993.

Paper entitled "Requirements and Method for High–level Multiplexing MPEG and Other Digital Service Bitstreams with Universal Transport Layer", International Organization for Standardization, Organisation Internationale de Normalisation, ISO/IEC JTC1 SC2/WG11 MPEG 92/754, dated Nov., 1992.

Paper entitled "Digital Compression Program Delivery System Introduction to the Multiplexing Formats", AT&T, dated Aug. 31, 1992.

SYSTEM AND METHOD FOR TRANSMITTING A PLURALITY OF DIGITAL SERVICES INCLUDING COMPRESSED IMAGING SERVICES AND ASSOCIATED ANCILLARY DATA SERVICES

This application is a continuation-in-part application of U.S. application Ser. No. 08/006,476 filed Jan. 20, 1993 entitled "Apparatus And Methods For Providing Close Captioning In A Digital Program Services Delivery System." This application contains subject matter related to U.S. application Ser. No. 08/160,841 entitled "System And Method For Transmitting A Plurality Of Digital Services Including Imaging Services"; U.S. application Ser. No. 08/160,841 entitled "Memory Efficient Method And Apparatus For Sync Detection"; issued May 30, 1995 and U.S. Pat. No. 5,420,640; U.S. application Ser. No. 08/160,839 entitled "Method and Apparatus for Locating and Tracking a QPSK Carrier"; U.S. application Ser. No. 08/161,159 entitled "Multi-Service Data Receiver Architecture"; and U.S. application Ser. No. 08/160,827 entitled "System And Method For Providing Compressed Digital Teletext Services and Teletext Support Services" all of which being filed concurrently with this application and all of which containing disclosure which is incorporated herein by reference.

BACKGROUND OF THE INVENTION

1. Field of the Invention

The present invention relates generally to digital signal transmission, and more particularly, to a system and method for multiplexing a plurality of digital services, including compressed imaging services and ancillary data services such as closed captioning for the deaf associated with the imaging services for transmission to a plurality of remote locations.

2. Description of Related Art

The background of the present invention is described herein in the context of pay television systems, such as cable television and direct broadcast satellite (DBS) systems, that distribute a variety of program services to subscribers, but the invention is by no means limited thereto except as expressly set forth in the accompanying claims.

In the pay television industry, programmers produce programs for distribution to various remote locations. A "program" may consist of video, audio and other related services, such as closed-captioning and teletext services. A single programmer may wish to supply many programs and services. Typically, a programmer will supply these services via satellite to individual subscribers (i.e., DBS subscribers) and/or cable television operators. In the case of cable television operators, the services transmitted via satellite are received at the operator's cable head-end installations. A cable operator typically receives programs and other services from many programmers and then selects the programs/services it wishes to distribute to its subscribers. In addition, a cable operator may insert locally produced services at the cable-head end. The selected services and locally produced services are then transmitted to the individual subscribers via a coaxial cable distribution network. In the case of DBS subscribers, each subscriber is capable of receiving a satellite down-link from the programmers directly.

In the past, pay television systems, including cable and DBS systems, have operated in the analog domain. Recently, however, the pay television industry has begun to move toward all digital systems wherein, prior to transmission, all analog signals are converted to digital signals. Digital signal transmission offers the advantage that digital data can be processed at both the transmission and reception ends to improve picture quality. Further, digital data compression techniques have been developed that achieve high signal compression ratios. Digital compression allows a larger number of individual services to be transmitted within a fixed bandwidth. Bandwidth limitations are imposed by both satellite transponders and coaxial cable distribution networks, and therefore digital compression is extremely advantageous.

Further background can be found in U.S. patent application Ser. No. 968,846, filed Oct. 30, 1992, titled System and Method For Transmitting a Plurality of Digital Services. This application is hereby incorporated by reference as if fully set forth herein.

With the growing trend toward a merger of the previously separate technologies of telecommunications including voice and data telecommunications and television including satellite, broadcast and cable television, there has emerged an increased interest in developing adaptable transmission systems capable of handling any one or more of a collection or plurality of such services. The primary media investigated for providing such services to date comprise, for example, coaxial cable, land-based microwave, so-called cellular radio, broadcast FM, broadcast satellite and optical fiber, to name a few.

Each media has its own characteristics. For example, comparing cable and satellite for digital data transmission, cable tends to have a medium error rate, but, when errors appear, the errors come in long bursts. Satellite as a media has a pretty poor error rate, primarily due to the requisite weak signal power, and hence, low signal to noise ratio. In satellite, then, the poor error rate is specially corrected utilizing such techniques as convolutional error correctors, not required in a cable environment.

In copending U.S. application Ser. No. 07/968,846 filed Oct. 30, 1992 and entitled "System and Method for Transmitting a Plurality of Digital Services", the disclosure of which is incorporated herein by reference, there is described an encoder for generating a multiplexer data stream carrying services to remote locations via, for example, a satellite or a cable distribution network. The generated data stream comprises a continuous sequence of frames, each frame comprising two fields, and each field comprising a plurality of lines. A first group of lines of a field defines a transport layer and a second group of lines defines a service data region. A feature of the disclosed scheme is the ability to dynamically vary the multiplexed data stream from field to field. A further feature of the disclosed scheme is that the data transmission rate of the multiplexed data stream is related to the frequency of known analog video formats, i.e. frame, field and horizontal line rates.

In copending U.S. application Ser. No. 07/970,918 filed Nov. 2, 1992, entitled "System and Method for Multiplexing a Plurality of Digital Program Services for Transmission to Remote Locations", the disclosure of which is incorporated herein by reference there is described another system, this for multiplexing a plurality of digital program services comprising a collection of, for example, video, audio, teletext, closed-captioning and "other data" services. According to the disclosed scheme, a plurality of subframe data streams are generated, each having a transport layer region and a program data region. These subframe data streams are then multiplexed together into superframes having a transport layer region and a subframe data region.

A decoder within a subscriber's home or at any other receiving terminal separates the multiplexed data stream into the various services. One such service is conventional television video images. In order to efficiently transfer video images, redundant information in the image is preferably removed, a process referred to as video compression. A number of video compression techniques are proposed and some techniques have been adopted, for example, International Standards Organization, ISO-11172 and 13818, generally referred to MPEG standards (including MPEG1 and MPEG2) where MPEG refers to Moving Picture Expert Group. Several manufacturers have developed integrated circuits to decompress MPEG 1 and MPEG2 compressed video data, for example Thompson-CSF, C-Cube and LSI Logic Corporation have all developed such decompression integrated circuits.

A standard analog NTSC composite video signal is already a compressed format. Diagonal luminance resolution has been given up in order to accommodate the color subcarrier within the luminance bandwidth. Unfortunately, the existence of the color subcarrier decreases the correlation between adjacent samples and adjacent frames, making it difficult to apply further stages of compression. For this reason, efficient compression algorithms are applied, not to the NTSC signal, but to the original separate components: brightness Y, first color difference, and second color difference or Y, U, V (luminarice and color differences).

Video compression is based on eliminating redundancy from the signal. There are two principal types of redundancy in video signals: psychovisual redundancy and mathematical redundancy. Efficient transmission systems attempt to eliminate both types of redundancy.

Psychovisual redundancy in the signal occurs as a result of transmitting information which the human eye and brain does not use, and cannot interpret. The most obvious example is the excess chrominance bandwidth in R,G,B signals. When a video signal is represented as R,G,B components, none of these components can be reduced in bandwidth without perceptible decrease in picture quality. However, when a full bandwidth luminarice signal is present, the eye cannot detect significant bandwidth reduction of the color information. NTSC makes use of this human psychovisual characteristic by converting the original R,G,B signal to Y,U,V components through a linear matrix. The U,V components can then be reduced in bandwidth to 25% of the luminance component without a loss of apparent picture quality. However, NTSC does not fully exploit color difference redundancy. It reduces bandwidth only in the horizontal dimension, whereas the eye is equally insensitive to chrominance detail in the vertical dimension. Other forms of psychovisual redundancy include: luminance detail on fast-moving objects, luminance diagonal resolution, and luminarice detail close to high contrast ratio transitions (edge masking). Elimination of psychovisual redundancy proceeds by transforming the signal into a domain in which the redundant information can be isolated and discarded.

Mathematical redundancy occurs when any sample of the signal has a nonzero correlation coefficient with any other sample of the same signal. This implies that some underlying information is represented more than once, and can be eliminated leading to data compression. In a minimally sampled television luminance signal of a typical image, adjacent samples are normally 90 to 95% correlated. Adjacent frames are 100% correlated in stationary areas, and more than 90% correlated on average.

In video compression, redundant information in a moving image is removed on a pixel-to-pixel basis, a line-to-line basis and a frame-to-frame basis. The compressed moving video image is transferred efficiently as one part of the services in the multiplexed data stream.

In present day equipment, moving video images are typically encoded in standard signal types such as analog NSTC composite video signals and PAL signals. These signals include periodic repetition of frames of information, each frame including periodic repetition of lines of information (the lines in a frame being organized into first and second fields), and each line including a synchronization information portion and an active video portion. A first subset of the lines of a frame is used for vertical synchronization. A second subset of the lines of a frame is used to transfer ancillary data, such as closed captioning for the deaf on line 21 among the many types of data, during a vertical blanking interval (hereinafter VBI), the data transferred during the vertical blanking interval being referred to as VBI data. The remaining lines, constituting a third subset of the lines of a frame, contain the video image. It is this video image which is most capable of being compressed in the standard video compression techniques.

In video compression techniques, the ancillary data or VBI data is removed from the image before compression. Thus, users who have come to rely on the ancillary VBI data transmitted during the vertical blanking interval of, for example, an NTSC signal, will be unable to enjoy these services when receiving compressed moving video image services transmitted through the multiplex data stream.

SUMMARY OF THE INVENTION

It is an object of the present invention to overcome the shortcomings in the prior art. It is a further object of the present invention to provide an apparatus conforming to industry-wide standards for transmitting all types of VBI dam. It yet another object of the present invention to provide an apparatus for decoding VBI data encoded in standard MPEG format so as to flexibly provide for control of the symbol width, symbol high data level and symbol low data level by encoding appropriate data at the encoder end.

These and other objects are achieved in a video system for processing compressed video data into composite video data, the composite video data corresponding to a standard composite video signal type selected from a plurality of standard types, the plurality of standard types including at least one of an NTSC composite video signal type and a PAL video signal type, the video system including a processor, a standard video decompressor and a video interface. The standard video decompressor processes the compressed video data into decompressed video data and user data, the user data having VBI data encoded therein. The processor culls the VBI data from the user data. The video interface processes the decompressed video data and the VBI data into the composite video data with the VBI data encoded therein. The video interface includes a VBI data generator to process the VBI data into VBI signal data, a mixer coupled to the video decompressor to receive the decompressed video data, the mixer being coupled to the VBI data generator to receive the VBI signal data the mixer providing output Y, U and V data during an active portion of a scan line, and circuitry to process the Y, U and V data into the composite video data.

BRIEF DESCRIPTION OF THE DRAWINGS

The invention will be described in detail in the following description of preferred embodiments with reference to the following figures wherein.

DETAILED DESCRIPTION OF PREFERRED EMBODIMENTS

A portion of the disclosure in application Ser. No. 968,846 is summarized and amended hereinbelow with respect to FIGS. 6–10 to provide further information useful in explaining a specific application of the present invention.

Figure 6:
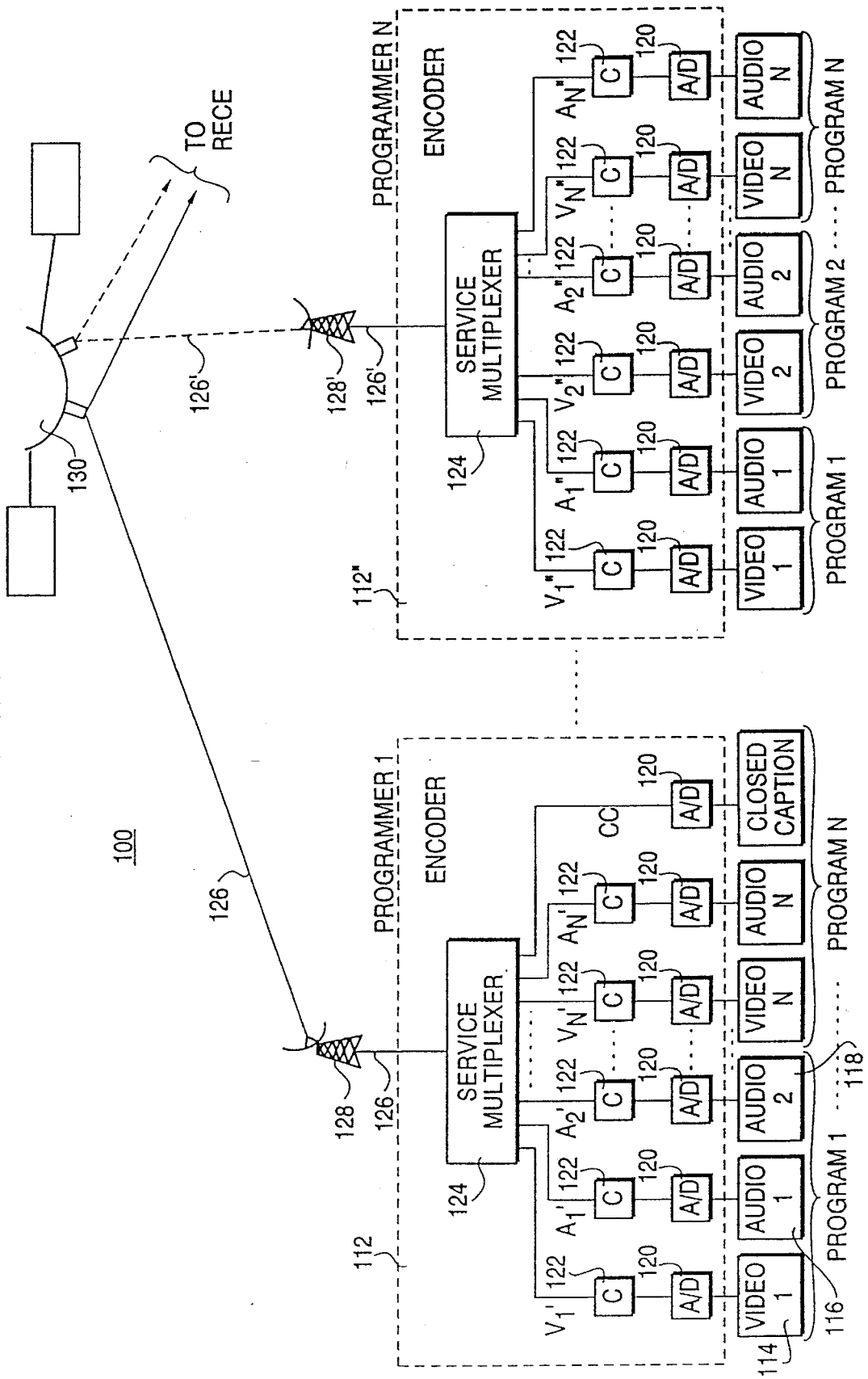
FIG. 6 is a partial block diagram of a system for multiplexing a plurality of digital services for transmission to a plurality of remote locations, as described in U.S. Patent application Ser. No. 968,846.

FIG. 6 shows a partial block diagram of a system 100 for multiplexing a plurality of digital services for transmission to a plurality of remote locations (not shown). In the pay television context, the system 100 comprises a plurality of service encoders 112 each of which is operated by a "programmer." As illustrated, any number N of programmers may be present in the system 100. As mentioned in the background, programmers are entities that provide "programs" for distribution to various subscribers. For example, as shown in FIG. 6, programmer 1 may provide programs 1 through N. Each program comprises a set of related services, such as video, audio and closed-captioning services. By way of example, FIG. 6 shows that programmer 1 is providing program 1 which comprises a video service 114 and two related audio services 116, 118 such as stereo sound. A given program can comprise a collection of related services, and a programmer may provide any number of programs.

Typically, the individual services of each program are produced in an analog format. According to the system and method of the present invention, each encoder 112 has a plurality of analog-to-digital converters 120 for converting services in analog form to digital services. In addition, video and audio services may be compressed by video and audio compression devices 122, however, compression is not required. As those skilled in the art know, there are many video and audio compression techniques available. For example, the Moving Picture Expert Group (MPEG) has developed a video compression algorithm that is widely used in the digital video services industry. Vector quantization is another, more recent compression technique for digital video. According to the present invention, any compression algorithm may be employed by the video and audio compression devices 122, and the devices 122 are by no means limited to any one compression method. Furthermore, as mentioned above, compression of audio and video services is not required. Compression merely serves to increase the amount of data that can be transmitted within a given bandwidth.

Each encoder further comprises a service multiplexer 124. As described hereinafter in greater detail, the service multiplexers 124 functions in accordance with the method of the present invention to multiplex the individual digital services for transmission to remote locations, such as a cable head-end installation or DBS subscriber. The service multiplexer 124 in each encoder 112 generates a multiplex data stream 126 which is fed to a transmitter 128 for transmission to the remote locations via a satellite 130. As illustrated in FIG. 6, each programmer (e.g., programmer 1 . . . programmer N) provides its own multiplex data stream 126. As described hereinafter in greater detail, the multiplex data streams may be received at various remote locations, such as a cable head-end, a DBS subscriber or a cable subscriber. Each remote location employs a service demultiplexer which extracts selected services from the multiplex stream in accordance with the method of the present invention. Further details of the service demultiplexer will be provided hereinafter.

Figure 7:
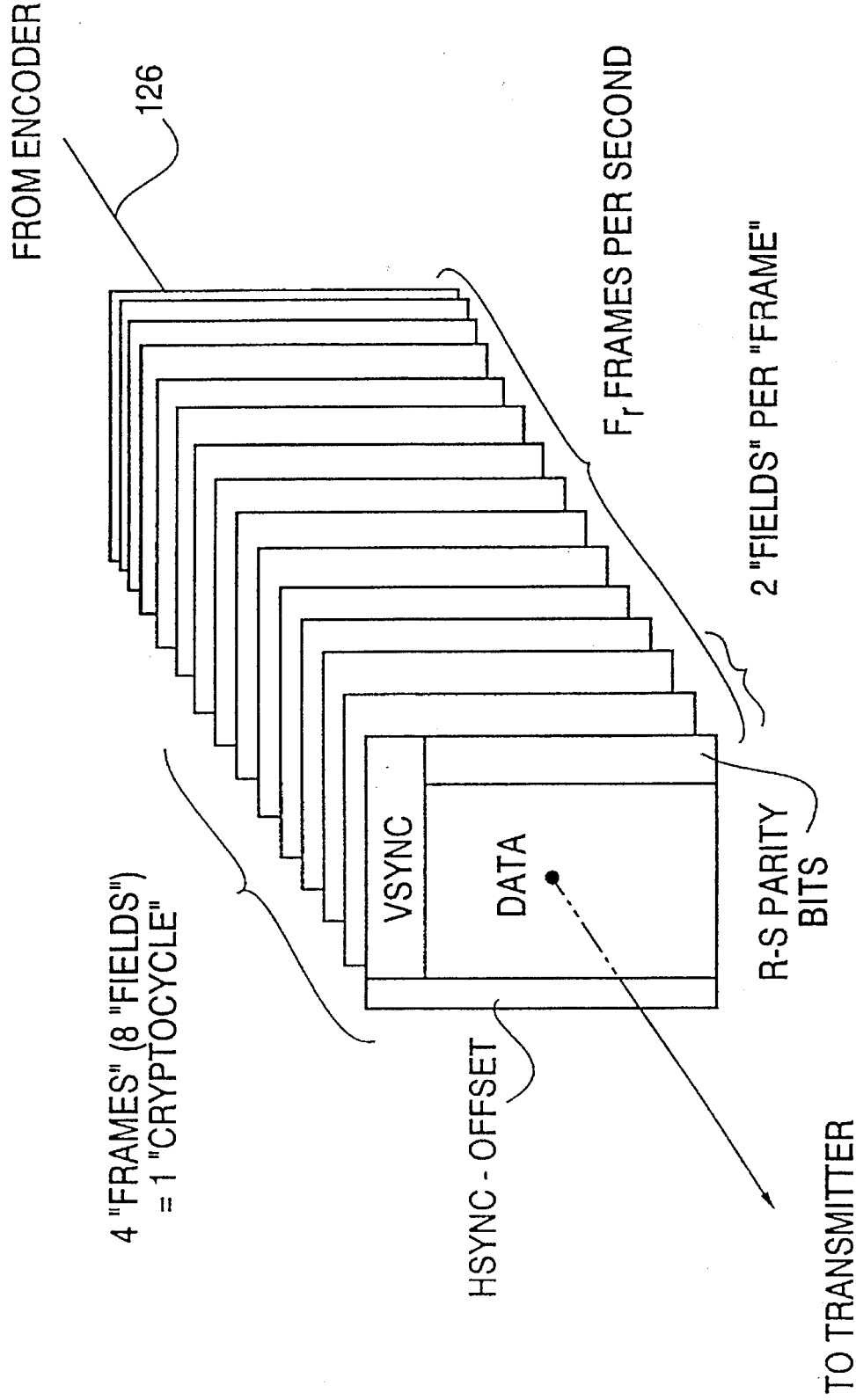
FIG. 7 is a graphical illustration of the multiplex data stream generated by an encoder.

FIG. 7 is a graphical illustration of the multiplex data stream 126 generated by each service multiplexer 124 in each encoder 112. According to the present invention, the multiplex data stream 126 comprises a continuous sequence of "frames." Each frame includes two "fields" as shown. As described hereinafter in greater detail, each field contains multiplexed service data and a "transport layer" that contains certain "system data" necessary for operating the system of the present invention. Because certain types of system data are too numerous to transmit in a single field, these types of data are transmitted over a series of fields referred to herein as "Groups of Fields." For example, a group cycle may comprise eight (8) fields; however, a group cycle can be defined by any number of fields. Essentially, group cycles define boundaries in the multiplex data stream 126 within which a complete set of system and encryption related data is transmitted. These group cycle boundaries may be either fixed or dynamically varying. As described hereinafter, the service demultiplexer at each remote location needs the system data in a given group cycle in order to extract selected services from the service data contained in the next group cycle.

As explained above in connection with FIG. 6, the video services carried in a multiplex data stream typically originate as analog video signals (except for HDTV signals), and as shown in FIG. 6, the analog video signals are "digitized" by analog-to-digital converters 120 and thus become "digital services." As described hereinafter in greater detail, at subscriber locations, selected digital video services are extracted from the multiplex data stream for viewing on a display device, such as a television, for example. Prior to viewing, however, the digital video services must be converted back to their analog form. As those skilled in the art know, there are several analog video signal formats widely used in the television industries. The NTSC format is widely used in the U.S., whereas the PAL format is used in most of Europe.

In one embodiment of this invention and in order to simplify hardware design and frequency generation throughout the system 100, the overall frame structure and transmission rate of the multiplex data stream 126 are preferably related to, and dependant upon, the particular analog video format of the video services being carried in the multiplex. The frame structure and digital transmission rate of the multiplex differ depending upon whether the video services carried in the multiplex are PAL video signals or NTSC video signals. Providing digital multiplex data rates and clocks that are related to key analog video frequencies simplifies hardware design throughout the system. In particular, the regeneration of analog video (as well as audio) signals at subscriber locations is greatly simplified.

Figure 8:
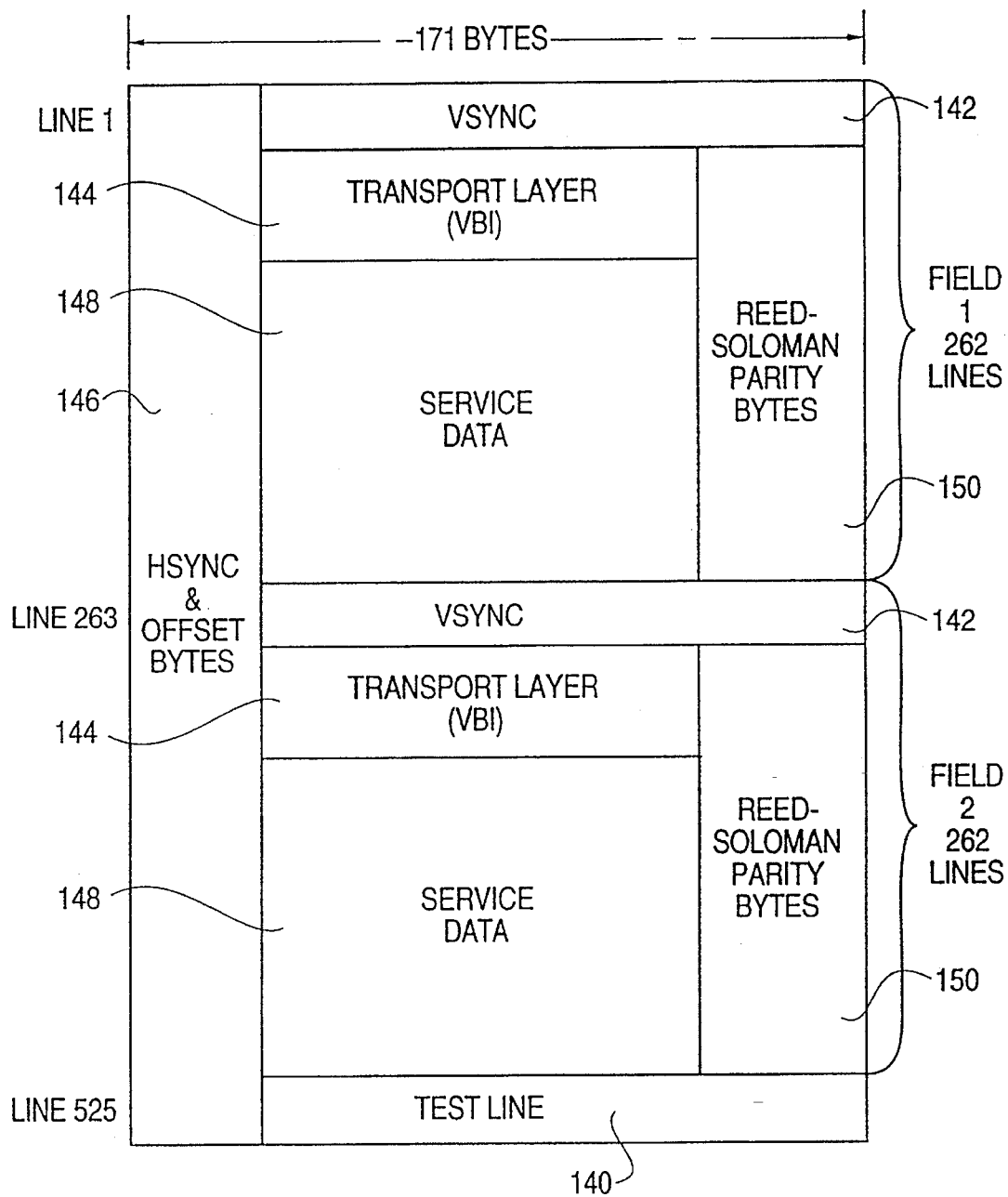
FIG. 8 shows in detail the general arrangement and contents of a related an frame of the multiplex data stream for transmitting NTSC video services.

FIG. 8 shows the general arrangement and contents of an exemplary frame of the multiplex data stream of FIG. 7 when the video services carded in the multiplex are based on the NTSC video signal format. The frame structure and transmission rate of the multiplex data stream are preferably related to their analog NTSC counterparts. As described below in greater detail, for example, the overall data rate of the multiplex data stream is related to the analog television line frequency $F_h$ which in the case of NTSC video signals is 15.734 kHz (i.e., $F_h$=15.734 kHz). As illustrated in FIG. 8, a frame preferably comprises a plurality of lines each of which are 171 bytes long (i.e., 1368 bits), wherein when the video services carried are NTSC format signals, the frame has 525 lines. For example, a digital service may include frames of 525 lines, each line having 171 bytes and transmitted at a rate of 15,734 lines per second to correspond to a respective analog service. As those skilled in the art will recognize, the 525 lines of the frame correspond to the number of lines in an analog NTSC picture. Additionally, the lines in each frame may be organized to include two "fields," each of which contains 262 lines. A test line 140 is added to the second field to achieve the 525 line total. As those skilled in the art will further recognize, this two-field structure is analogous to the two-field format of NTSC signals.

To achieve correspondence between the multiplex dam rate and analog NTSC frequencies, each line of the frame is transmitted at a frequency equal to $F_h$, the horizontal line frequency. In the case of NTSC video, $F_h$ is 15.734 kHz. Thus, when NTSC video services are carried in the multiplex, the multiplex data rate is:

$$\frac{171 \text{ bytes}}{\text{line}} \times \frac{8 \text{ bits}}{\text{byte}} \times F_h = 1368 \times F_h$$
$$= 1368 \times 15.734 \text{ kHz}$$
$$= 21.5 \text{ Mbps}$$

As expected with 525 lines, the overall frame rate is 29.97 Hz which is equal to the analog frame rate of NTSC video signals. As those skilled in the art will recognize, the multiplex rate of 1368 $F_h$ does not exactly match the NTSC regeneration rate. The NTSC regeneration rate is actually 1365 $F_h$, and therefore, decoders at subscriber locations must perform a rate conversion in order to accurately regenerate the analog NTSC video signals. A single 21.5 Mbps multiplex data stream may be modulated and transmitted within a 6 Mhz cable channel, and two 21.5 Mbps multiplex data streams can be interleaved and transmitted over a single C-Band satellite transponder.

Referring still to FIG. 8, each field of the frame begins with a VSYNC word 142, and each line begins with an HSYNC byte 146. As described hereinafter, a service demultiplexer in a decoder at each subscriber location uses the HSYNC and VSYNC patterns to establish frame and field synchronization after receiving a multiplex data stream. The VSYNC word 142 is generated similarly for each field, and may be bit-inverted every other field. The HSYNC byte 146 is preferably the same for each line. The VSYNC word 142 in each field is preferably followed by a "transport layer" 144. In general, the transport layer 144 in each field contains "system data" needed for operation of the system of the present invention, and more importantly, specifies the contents and structure of the "system data" and service data that follow in the field. As described hereinafter in greater detail, an important part of the transport layer 144 is the "multiplex map" which follows directly after the VSYNC word 142 in each field. The multiplex map specifies the number and location of transport layer packets that follow in the field and is dynamically adjustable on a per field basis to achieve great flexibility.

As shown in FIG. 8, the transport layer 1.44 of each field is followed by a service data space 148 which contains the audio and video service data carded in the multiplex data stream. As explained hereinafter in greater detail the plurality of video services and audio services carried in each field are variably partitioned within the field so that the system can accommodate multiple service data rates. The data rate for a service can vary from the HDTV rate (approx. 17 Mbps) to the telecommunications standard T1 data rate of 1.544 Mbps. The amount of data assigned to video, audio and other services can be adjusted among the services. Portions of the service data space not used for audio services may be reassigned as video or other service data. Audio services are not tied to video services within the field, and therefore, the system can provide "radio" services. Because of the dynamic allocation of service data within a field, the individual video services are not required to have the same data rate. The possible combinations of services that a programmer can provide in one multiplex data stream are limited only by the maximum data rate of the multiplex data stream (i.e., 21.5 Mbps) and the variable partitioning increment size. With the flexible method any future digital services with data rates as low as the telecommunications standard T1 rate can be accommodated. As further shown, the transport layer 144 and service data portion 148 of each frame are error coded using a 20 byte Reed-Solomon error correcting code 150. Those persons skilled in the art will appreciate, however, that any block-oriented error correcting scheme may be employed without deviating from the true spirit and scope of the present invention.

Figure 9:
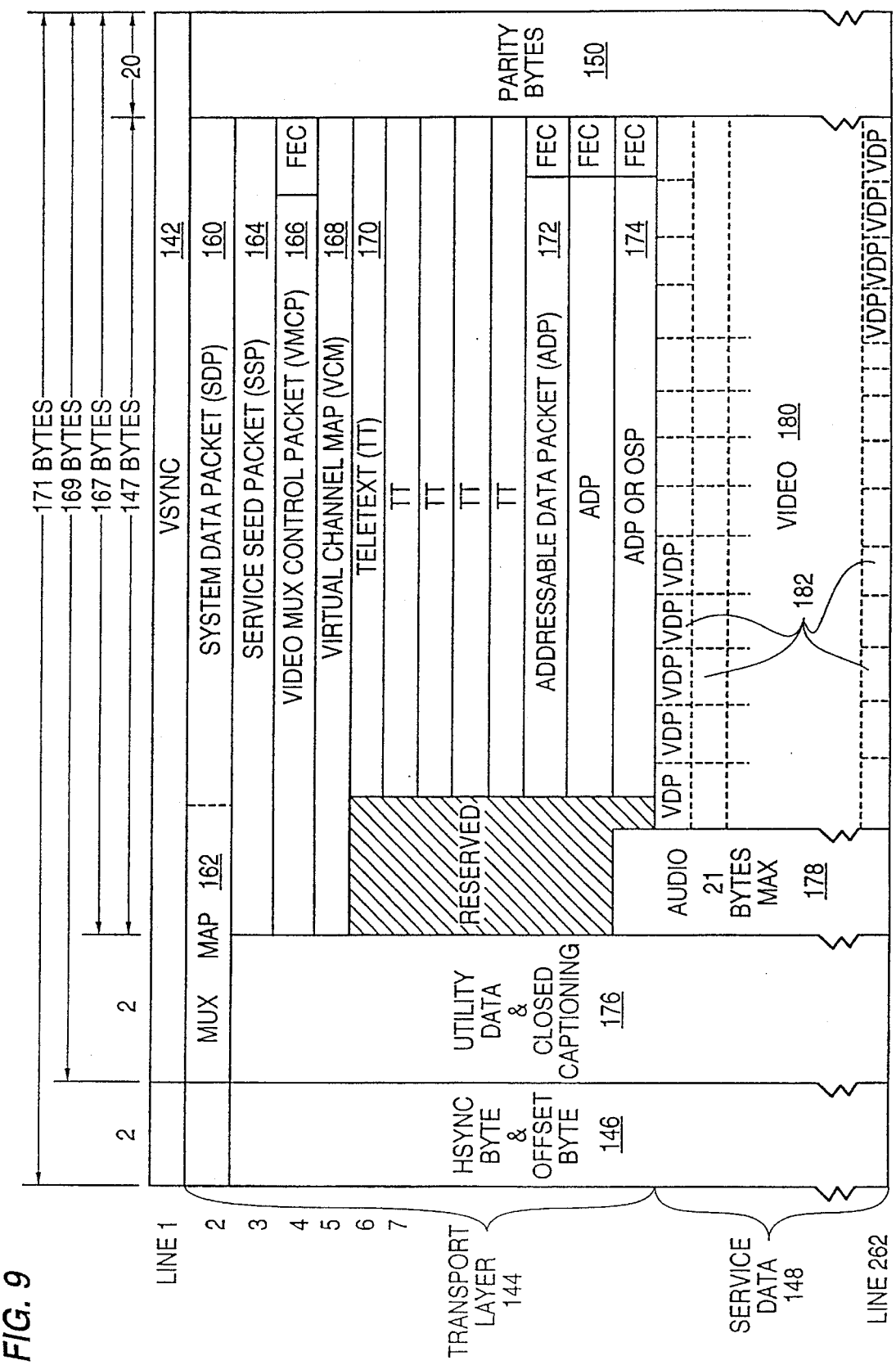
FIG. 9 shows in detail the data and services that can be carried in an exemplary first field of a related art frame of the multiplex data stream.

FIG. 9 shows further details of the general arrangement and contents of the first field of an exemplary frame of a multiplex data stream in accordance with an embodiment of the present invention. As shown, the first line of the transport layer 144 (i.e., line 2 of the field) comprises a system data packet 160 (SDP) that includes a multiplex map 162. Subsequent lines of the transport layer may comprise service seed packets 164 (SSP), video multiplex control packets 166 (VMCP), virtual channel map packets 168 (VCM), teletext data packets 170 (TT), addressable data packets 172 (ADP), and optional system packets 174 (OSP). The multiplex map 162 is transmitted with each field and specifies the number and location of every other type of data packet in the transport layer 144 of that field. With the multiplex map 162, the number and location of each other type of transport layer packet may be dynamically altered on a per field basis to achieve a great degree of flexibility. For example, as described below in greater detail, the multiplex map 162 can be used in a "full-field" mode to allow an entire field of the multiplex data stream to be used for system data such as addressable data packets 174 (ADPs). It should be noted that not every type of transport layer packet need be transmitted in every field. For example, some packets, such as system seed packets 164 (SSPs), may be transmitted only in the first few fields of a cryptocycle. The content and arrangement of data within each packet will be described hereinafter in greater detail.

Still referring to FIG. 9, a portion of each field is allocated to service dam 148. According to the method of the present invention, audio services, utility data and closed-captioning services and video services are separated within the field. As shown, utility and closed-captioning data 176 may be transmitted at the beginning of each line of the transport layer 144 as well. The audio portion 178 of each field is proportionally allocated among the various audio services being transmitted. The size of the audio portion 178 of each field is adjustable for accommodating different numbers of audio services. For example, the audio portion 178 of each field may include a maximum of 21 bytes on each line of the service data area 148.

The video portion 180 of the service data area 148 of each frame comprises a plurality of smaller video data packets 182 (VDPs). For example, the VDPs may each be 60 bits wide, although any size VDP may be used without deviating from the spirit and scope of the invention. Each of the 60 bits in an VDP may be allocated to a particular video service being transmitted. For example, if there are 5 video services being transmitted, each service could be allocated 12 bits out of every VDP. The 60 bits in each VDP may be allocated among the various services in proportion to the individual data rate of each service. For example, a video service having a high rate may be allocated more bits in each VDP than a video service having a lower rate. Although the allocation of VDP bits in a single frame remains fixed, the allocation may be adjusted on a per frame basis. As explained hereafter in greater detail, the video multiplex control packets (VMCPS) 166 in the transport layer 144 specify the video service allocation within the VDPs of a given field. In the preferred embodiment, even though the VMCPs are transmitted in the transport layer of every field, the allocation of services within each VDP may be dynamically altered on a per frame basis only so as to support statistical multiplexing. Those skilled in the art will appreciate, however, that the allocation of services within each VDP may be dynamically altered on a per field basis, if desired.

Figure 10:
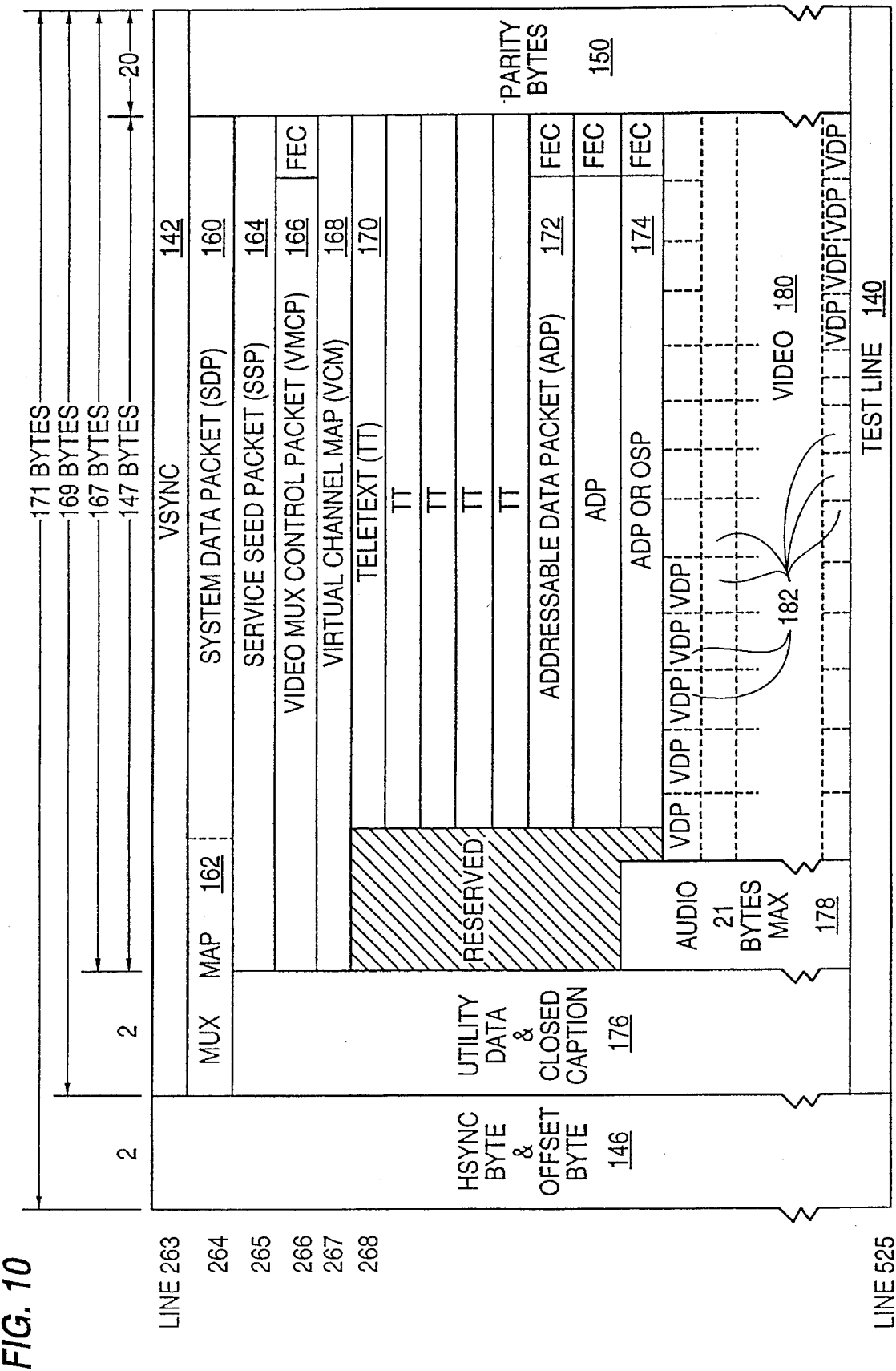
FIG. 10 shows in detail the data and services that can be carried in an exemplary second field of a related art frame of the multiplex data stream.

FIG. 10 shows details of a second field of an exemplary frame, the embodiment for which FIG. 9 shows the first field, of a multiplex data stream. As can be seen, the second field is generally similar in structure and arrangement to the first field; the main difference being the addition of a test line 140. As mentioned previously, the test line 140 is the last line of every frame of the multiplex data stream and allows each field to be exactly 261 lines (not including VSYNC). The test line 140 is not error coded with the Reed-Solomon code as are lines 264–524 of the second field. The test line may be used to carry system test data, if desired.

Referring to both FIGS. 9 and 10, the third and fourth bytes on each line of each field carry utility and closed-captioning data. Only the first 15 of 16 bits are utilized for utility data; the 16th bit is used for closed-captioning data. Additionally, five lines in each frame (i.e., both fields) do not carry utility and closed-captioning data. These include the two VSYNC lines 142, the test line 140 and lines 2 and 264 of the first and second fields respectively. The total bit capacity for utility data for one frame is then:

(525–5)*lines**(15 bits/line)=7800 bits.

Those 7800 bits are partioned into 8 separate "channels" of utility data. Thus, there are 975 bits/channel in each frame. These are preferably error coded using a (3,2,13) convolution FEC to yield an error-corrected capacity of:

975*⅔=650 bits/channel/frame.

The resultant maximum data rate for each channel of utility data is then:

$$\frac{650 \text{ bits}}{\text{frame}} \times \frac{1 \text{ Frame}}{525 \text{ lines}} \times \frac{15,743 \text{ lines}}{s} = 19.48 \text{ KBps}$$

This rate is slightly higher than the industry standard 19.2 KBps rate, but with the excess capacity, worst-case incoming data channels can be handled by running at the slightly higher rate. A 19.48 kHz clock is easily derived from $F_h$ since 19.48 kHz is equal to 2730/2205 $F_h$. This illustrates one advantage of relating the overall multiplex data rate to the horizontal line frequency. Alternatively, the utility data in each frame can be partitioned into 16 separate channels, where each channel runs at 9600 Kbps.

Closed-captioning data may be transmitted by the last bit of the fourth byte of each line (i.e., bit 16 of the utility & closed-captioning data space). As with the utility data, closed-captioning data (i.e., 1 bit per line) is sent on the same 520 lines of each frame. As those skilled in the art know, video services often have associated closed-captioning data. In the analog NTSC format, two bytes (i.e., two characters) of closed-captioning data are sent on line 21 of each analog video frame. The 520 closed-captioning bits are partitioned into 20 separate "channels" of 26 bits each. Each "channel" corresponds to a different video service in the multiplex data stream. In each frame, therefore, up to 20 video services may carry associated closed captioning data. The first 26 bits in the frame correspond to video number 1, the second 26 bits correspond to video number 2, and so on. In this example, only the first sixteen bits of each 26 bit partition are used. Thus, as with line 21 in the analog NTSC format, two characters are transmitted per frame per video service.

The frame within which data is transmitted may be generally in a form of a frame of data demarked by a frame sync and having data internal to the frame separated into one or more segments, each segment demarked by a horizontal sync. Although these terms may have originated in the context of television pictures, there is no reason to be so constrained in the present context of digital transmission in a multiplexed data stream. For example, the quantity of data transmitted in association with each frame sync or horizontal sync may differ from the quantity of data transmitted in association with each frame sync or horizontal sync may differ from the quantity of data transmitted in a conventional television picture. In fact, the quantity of data transmitted in each frame of the multiplexed data stream and associated with either a frame sync or a horizontal sync may be either any predetermined fixed quantity or a dynamically varying quantity so as to respond to transmission requirements of the transmission channel. Thus, each frame of data may be organized more in terms of transmission requirements (e.g. transmission through noise in the transmission channel, error correction, different data having different error probability requirements, etc.) than in terms of resolution and update rate of any picture display.

Figure 15:
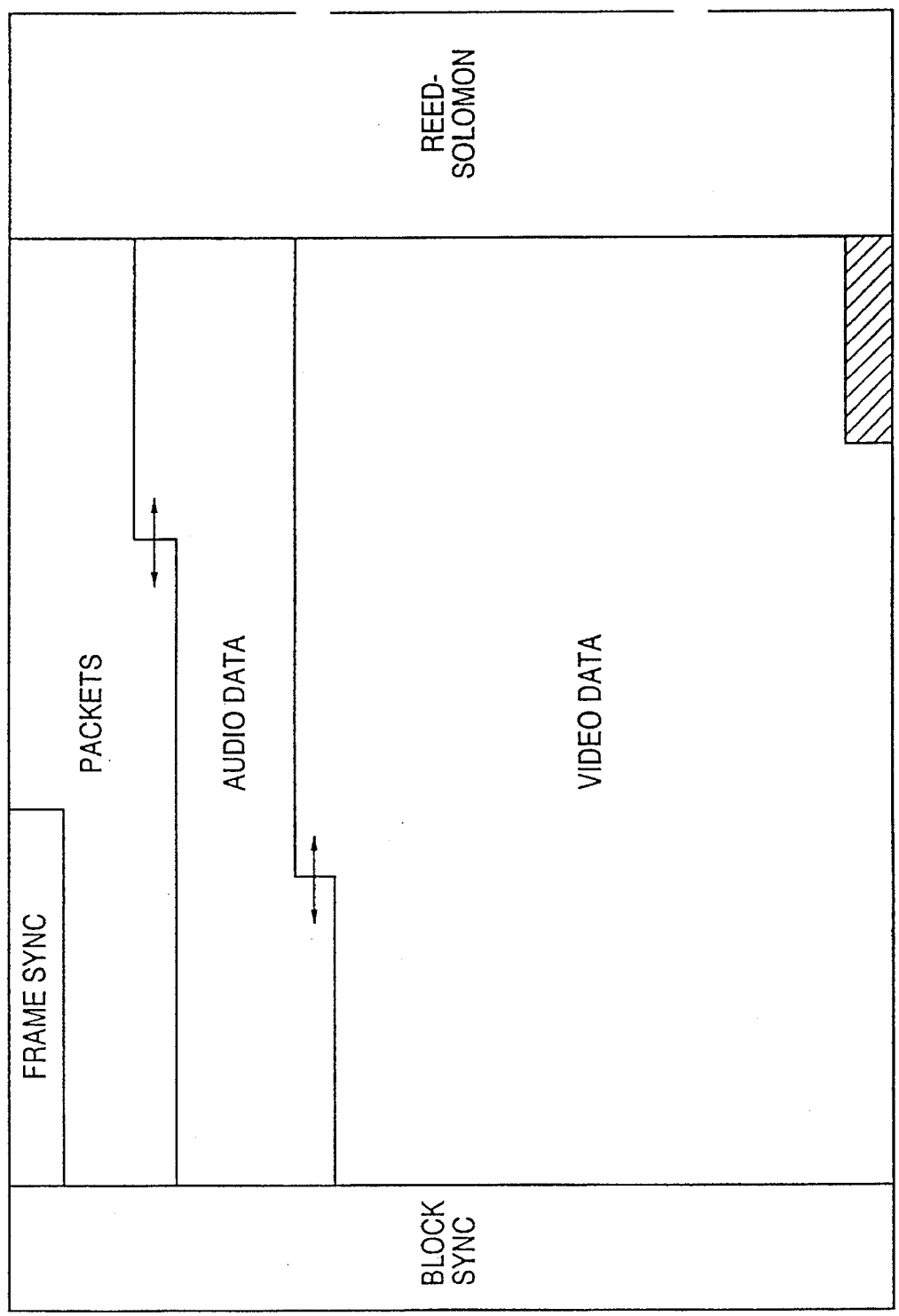
FIG. 15 is an alternative frame format according to the present invention.

Within the context of such flexible frames of data, information transmission may be functionally organized into, for example, low speed data, medium speed data and high speed data as depicted in FIG. 15 as packets, audio data and video data, respectfully. The data in the frame depicted in FIG. 15 is preferably apportioned among packets, audio data and video data in such a way as to be indifferent to boundaries between segments demarked by horizontal syncs. In FIG. 15, the data in each segment demarked by a horizontal sync preferably contains an Reed-Solomon (or equivalent) error detection/correction code, the remaining portion of the data segment including functionally partitioned information to be transmitted.

Figure 16:
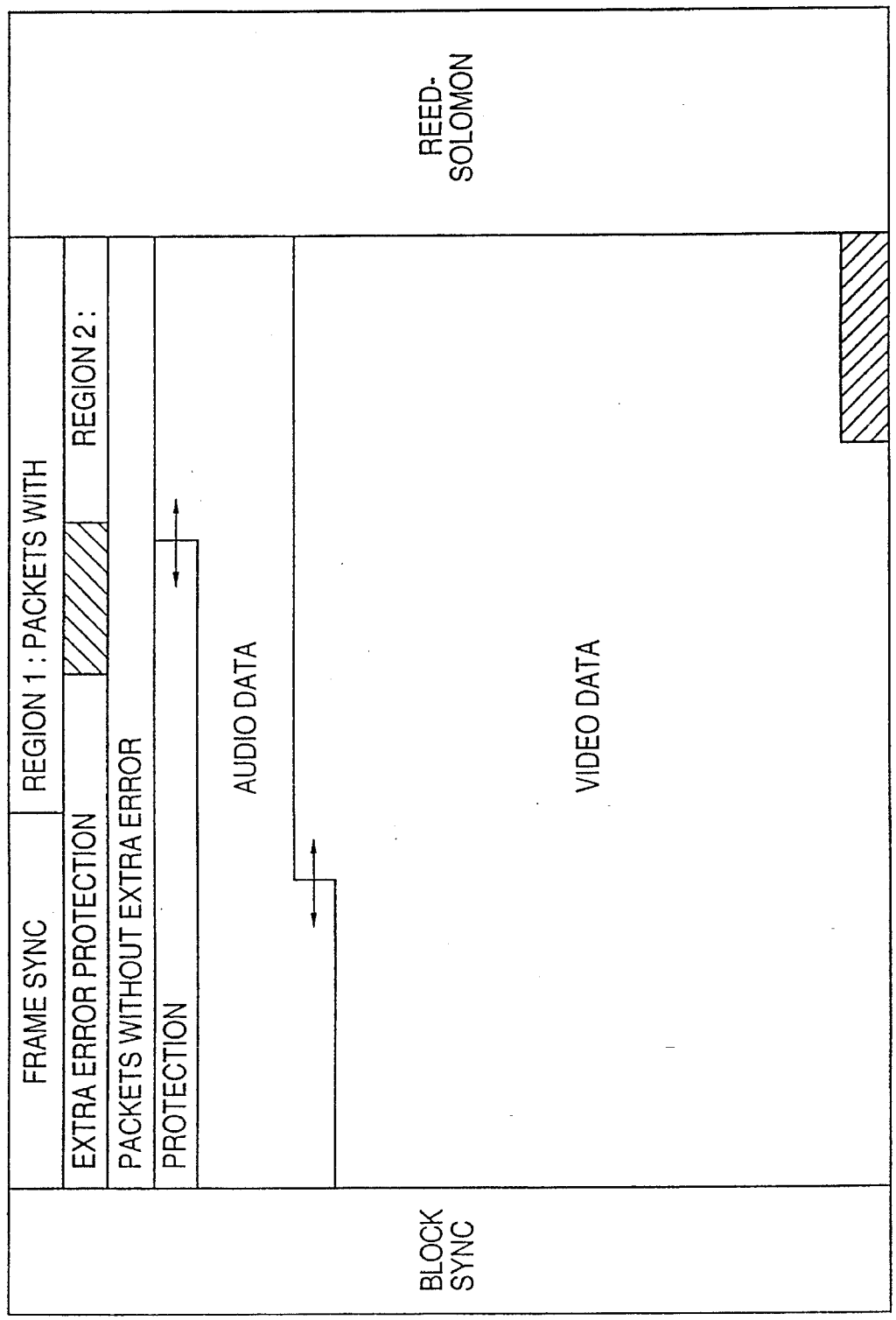
FIG. 16 is another alternative frame format according to the present invention.

FIG. 16 shows that the functionally partitioned packet data may be further partitioned into regions 1 and 2, region 1 to be used to transmit information requiring low transmission error probabilities when compared to transmission error probabilities of information contained in region 2. For example, multiplex structure control or encryption seed delivery may require extra low transmission error probabilities. Also, the particular information types to be included in this region 1 may dynamically vary depending on the expected noise level in the physical transmission channel so that the information therein transmitted may be received with a specified low transmission error probability.

Figure 11:
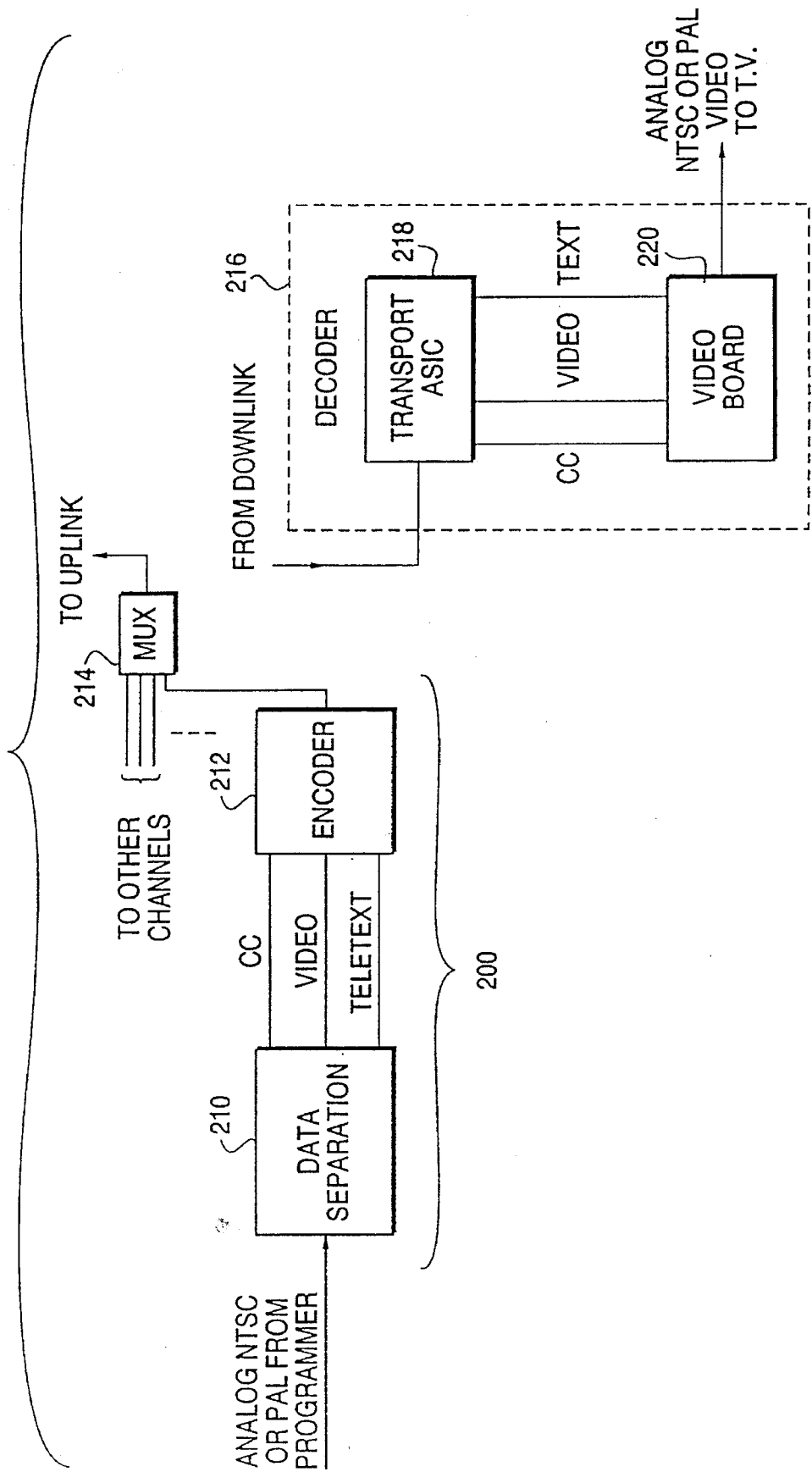
FIG. 11 is a block diagram illustrating, in a simplistic manner, an exemplary environment for the present invention.

FIG. 11 is a block diagram schematically illustrating uplink encoder 200 and decoder 216 in an environment for an embodiment of the present invention. This figure has been simplified to place the present invention in context. Analog NTSC video (or PAL) is received from the programmer, and the closed-captioning (CC) data is separated from the analog signal by a data separation circuit 210, which is commercially available. All the analog data is converted to digital data and eventually finds its way into the 21.5 Mbps multiplex.

After being encoded by an MPEG encoder 212 and multiplexed by a multiplexer 2 14, the multiplexed data is fed to a transport ASIC 218 in a decoder 216 (i.e., after passing through the uplink and downlink channels), which decoder demultiplexes the data and provides the CC, TEXT and Video data separately to a video board 220 that digitally recreates the original line 21 and converts it to analog form. The video board also decodes the MPEG encoded video, converters it to analog and inserts line 21 in the appropriate line and field, thereby reproducing the original NTSC video signal. The system is also capable of reconstructing PAL video signals.

Figure 12:
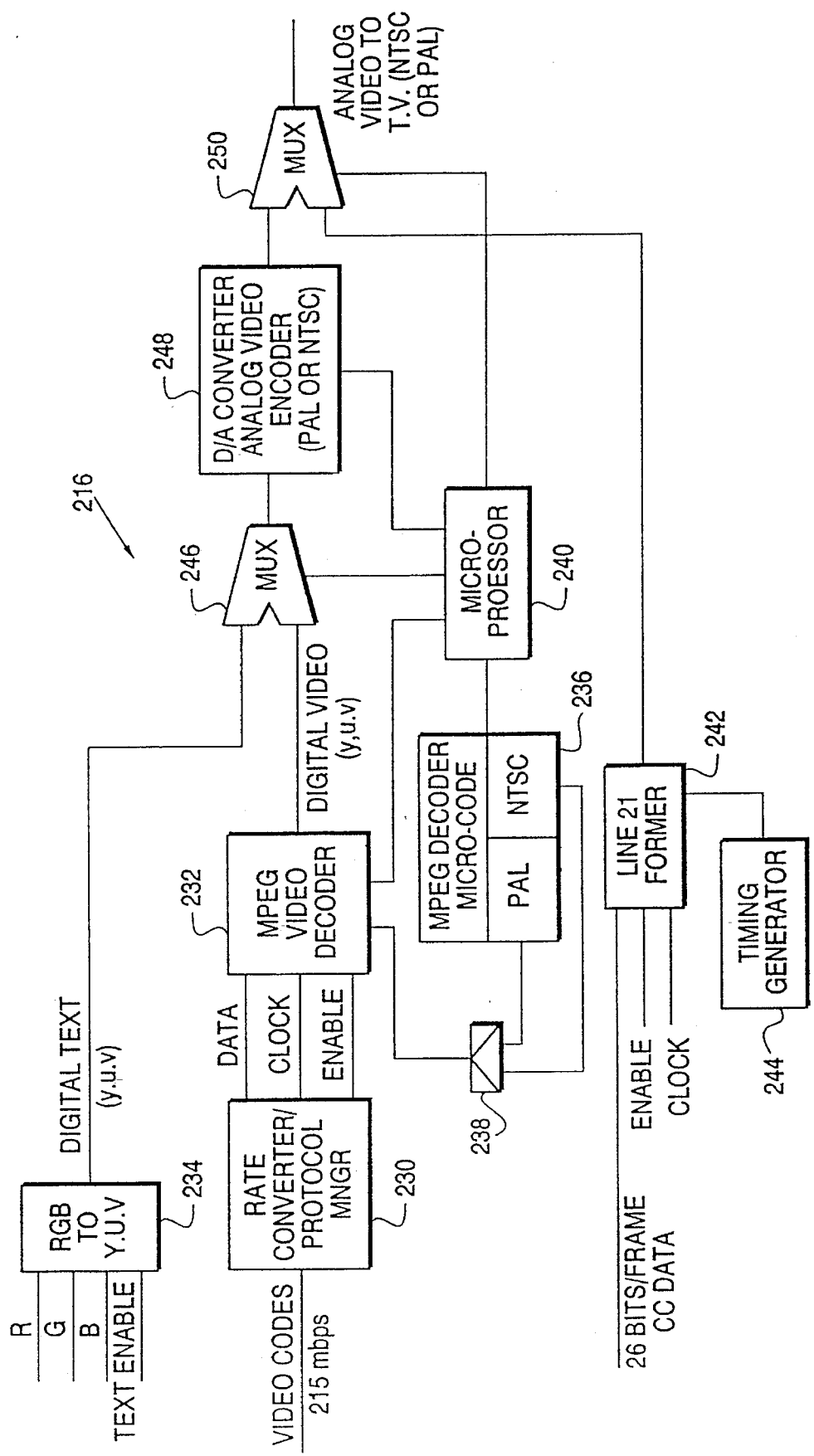
FIG. 12 is a block diagram of a decoder 216.

FIG. 12 shows details of the video board of FIG. 11. As shown, teletext data in digital RGB form is received and fed to an RGB-to-YUV converter 234 and then passed to a multiplexer 246. MPEG encoded video is received at the 21.5 Mbps rate and fed to a rate converter/protocol manager 230. From there the encoded video is decoded using an MPEG Video Decoder Chip 232, which is available from C-Cube Microsystems (part no. CL950). The MPEG Chip is capable of decoding both NTSC and PAL video, depending on the microcode it receives from a memory 236 via a switch 238. The decoded video is then sent to the other input of the multiplexer 246. Thus, either teletext or decoded NTSC (or PAL) video will be provided to a D/A converter/Analog video encoder 248, the latter device outputting baseband video signals. The D/A converter is capable of producing either NTSC or PAL analog signals from digital inputs. The microprocessor 240 tells both the MPEG decoder and the analog video encoder which signal to produce. The multiplexer is described in detail in the above-referenced U.S. patent application Ser. No. 968,846.

Closed-captioning data may be fed to the decoder 216 at a rate of 26 bits per frame. As shown in FIG. 12, the 26 bits of CC data are passed to a line 21 former circuit 242, which regenerates line 21 in analog form. The line 21 former circuit and an associated timing generator circuit 244 are described below with reference to FIG. 13. Once formed, line 21 is inserted into the proper NTSC analog video field by a second multiplexer 250. The circuit is controlled by a microprocessor 240.

Figure 13:
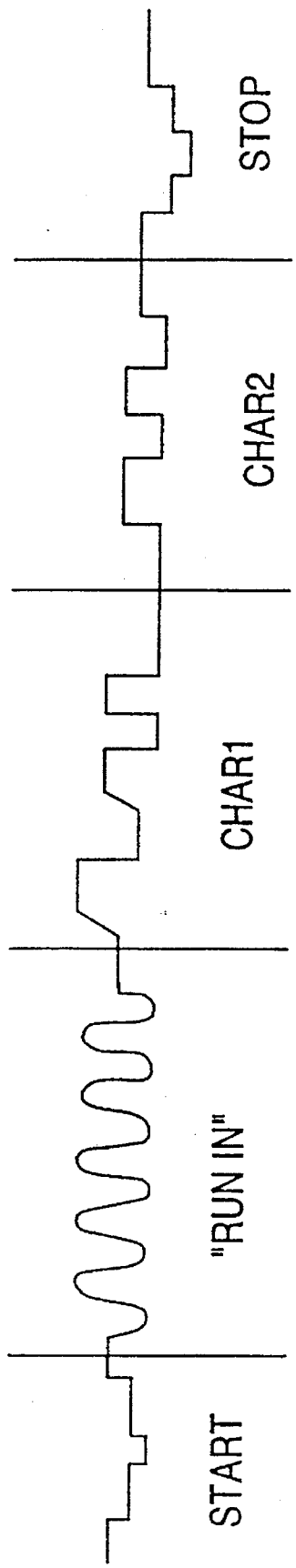
FIG. 13 depicts an exemplary line 21 waveform in accordance with the present invention.

FIG. 13 illustrates the line 21 wave form according to one embodiment of this invention. The signal begins with a start bit. The start bit is followed by a sine wave (RUN IN) which is used to alert a CC decoder and establish synchronization. The sine wave is followed by two characters of closed captioning text (CHAR 1 and 2). A stop bit (STOP) follows. When a subscriber buys a closed captioning decoder, that decoder simply pulls line 21 out of every NTSC frame, buffers the CC text characters until full sentences have been received, and then displays them on the screen for the user to read. This process is described below.

Figure 14:
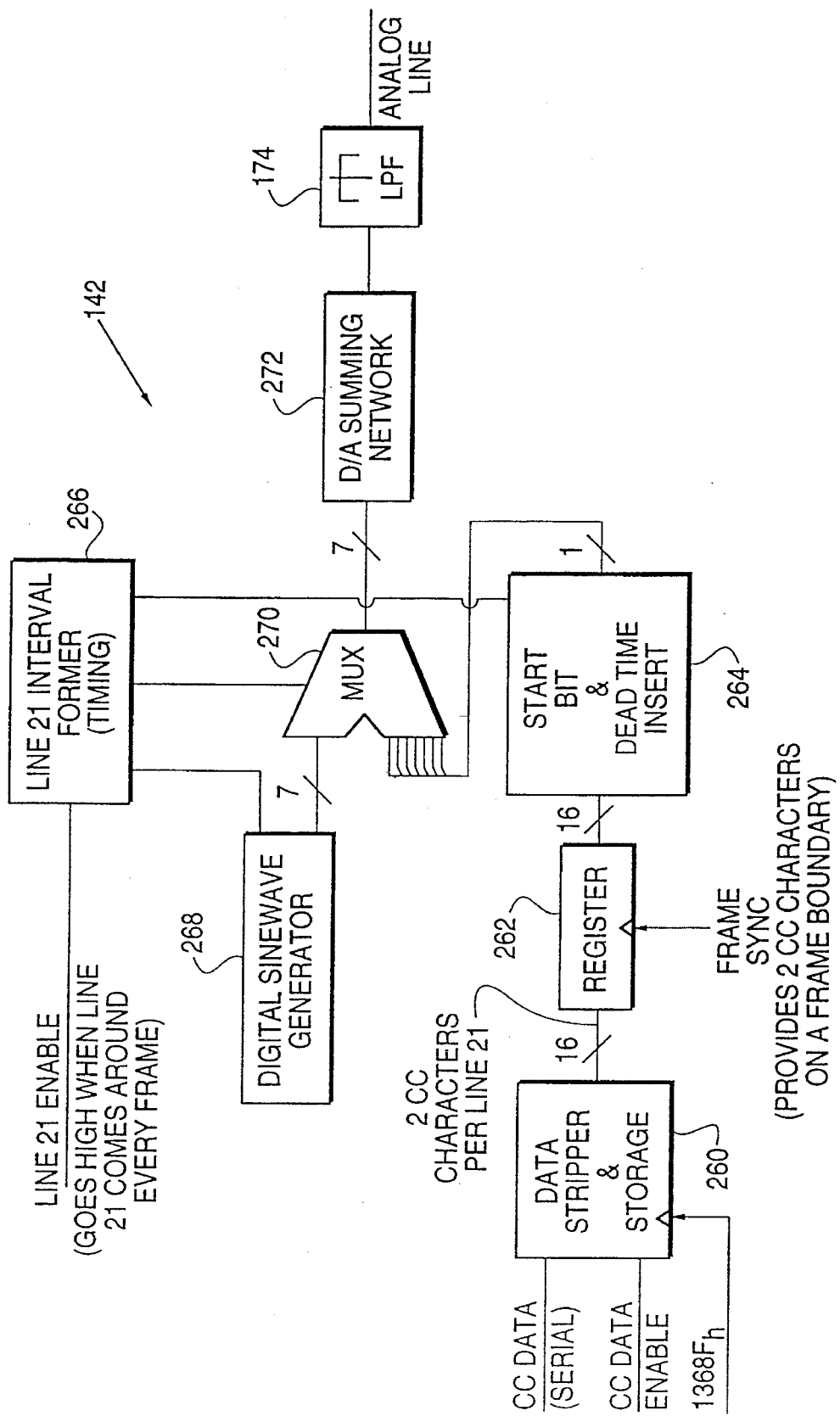
FIG. 14 is a block diagram of the line 21 former circuit 242 of FIG. 12.

FIG. 14 depicts details of the line 21 former circuit 242 of FIG. 12. The 26 bits of CC data provided in each frame are received by a data stripper and storage unit 260 that buffers the received data and separates every two characters (i.e., bytes) of CC data. The two characters to be inserted in a given line 21 are then stored in a 16-bit register 262. The register is clocked with a frame sync signal so that the characters are provided on a frame boundary (recall that line 21 is provided every other field, i.e., once per frame). The two characters are then sent to a circuit 264 that inserts the start bit and required dead time into the signal. The CC information is still digital at this point. This is then fed to multiplexer 270. A digital sine wave generator 268 creates a digital sine wave which is supplied to the other input of the multiplexer 270.

When line 21 is required to be formed, the line 21 enable line goes high for the entire line 21 interval. This enables the line 21 interval former circuit 266, which controls the timing of various circuit components. Specifically, the line 21 interval former controls the multiplexer 270, the sine wave generator 268, and the start bit and dead-time insert circuit 264 so that a complete digital representation is converted to analog in a D/A summing network 272. The analog signal is then low-pass filtered by a filter 274 to remove sharp edges. The result is an analog reconstruction of the original line 21 that was separated from the NTSC video at the encoder 112. The reconstructed line 21 is then inserted into the appropriate analog NTSC field.

One advantage of the circuit of FIG. 14 is that line 21 is completely reconstructed digitally. Specifically, the sine wave is reconstructed digitally, and then the entire digital representation is D/A converted. Another option would be to generate the sine wave in analog. However, by constructing the sine wave digitally, the entire line 21 former circuit can be implemented in a single ASIC. Thus, a mix of discrete analog and digital circuitry is not required.

Figure 1:
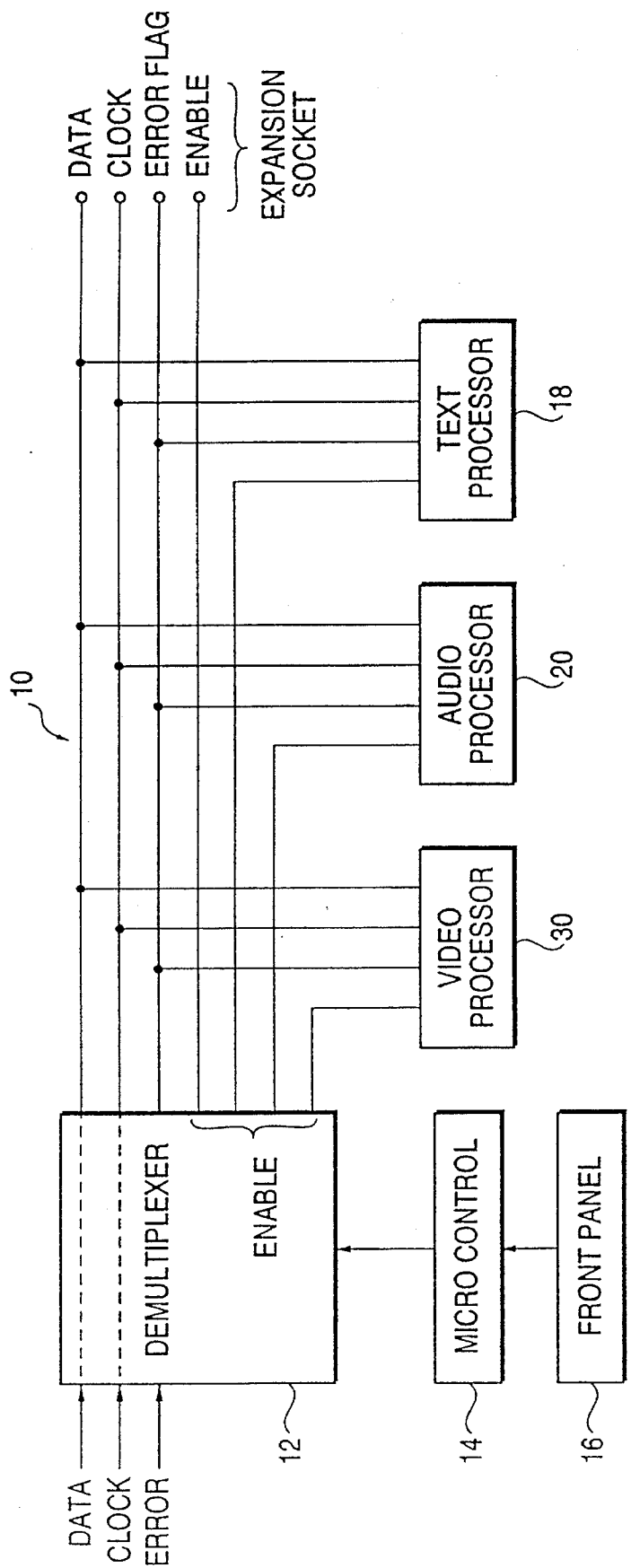
FIG. 1 is a partial block diagram of a decoder portion according to the present invention.

In a further embodiment, FIG. 1 is a block diagram showing a portion 10 of a decoder for such digital multiplexed data services. This portion 10 includes the multiplexer 12 controlled by microcontrol 14 under direction of front panel controls 16 actuated by a user. The demultiplexed data stream may include text information or audio information, for example, stereo music distribution. This text information and audio information is reconstructed in text processor 18 and audio processor 20, respectively. The demultiplexed information may also include video information with associated ancillary data information (e.g., sound associated with the video information). This information is processed in video processor 30.

Figure 2:
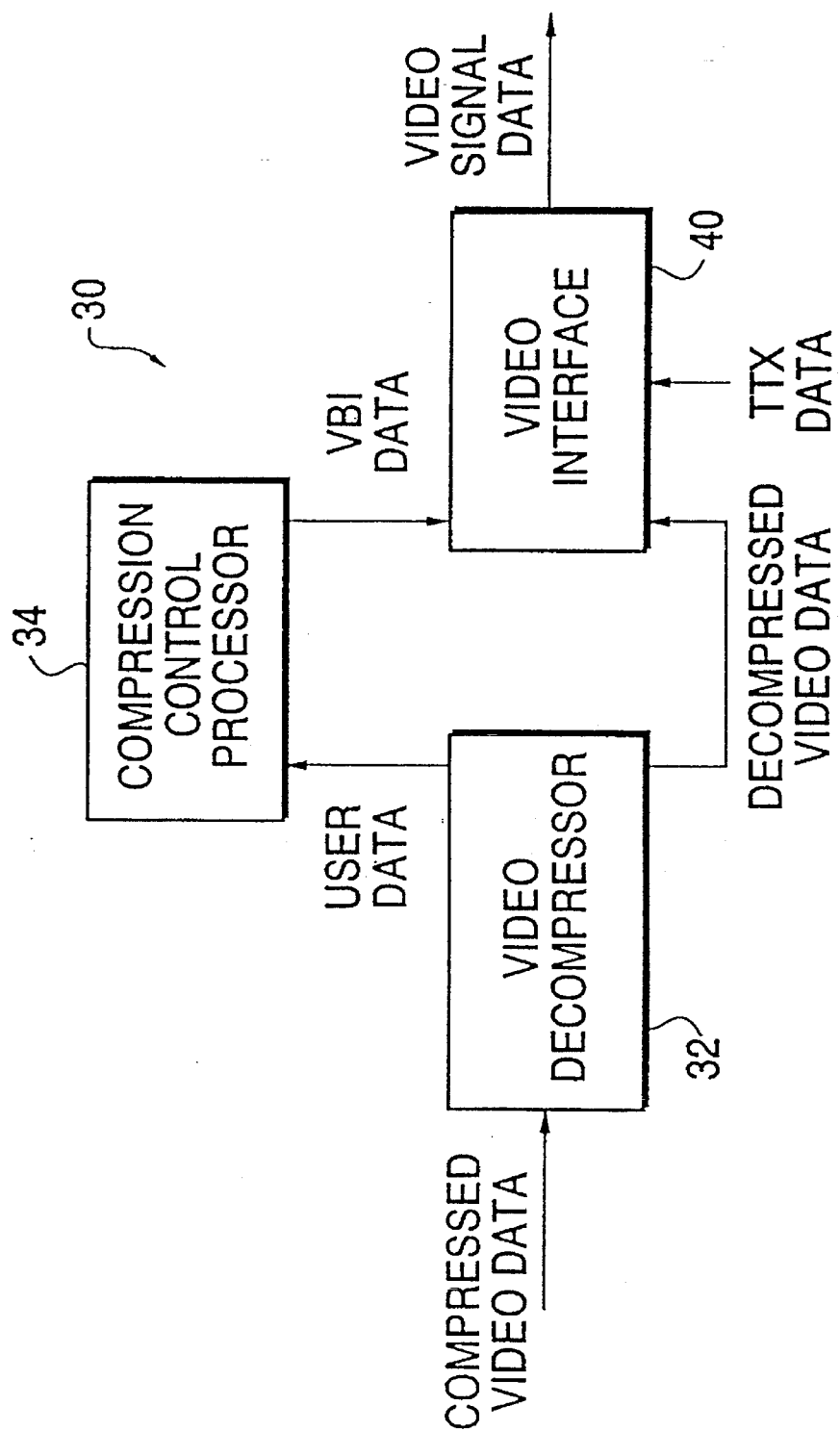
FIG. 2 is a block diagram showing the video processor of the present invention.

In FIG. 2, video processor 30 includes video process decompressor 32, compression control processor 34 and video interface 40. The compressed video data input to video process decompressor 32 includes blocks of data such as compressed video, associated audio, other overhead control information and user data. The video process decompressor 32 reduces decompressed video data which is output to video interface 40. The video process decompressor 32 also separates out the user data which is output to compression control processor 34. The compression control processor 34 identifies and culls out vertical blanking interval data which has been packed into the user data. The VBI is then output from the compression control processor 34 to the video interface 40. Preferably, text (TTX) dam from text processor 18 or from video process decompressor 32 or other source is also provided to video interface 40. Video interface 40 processes these signals to output composite video signal data.

Figure 3:
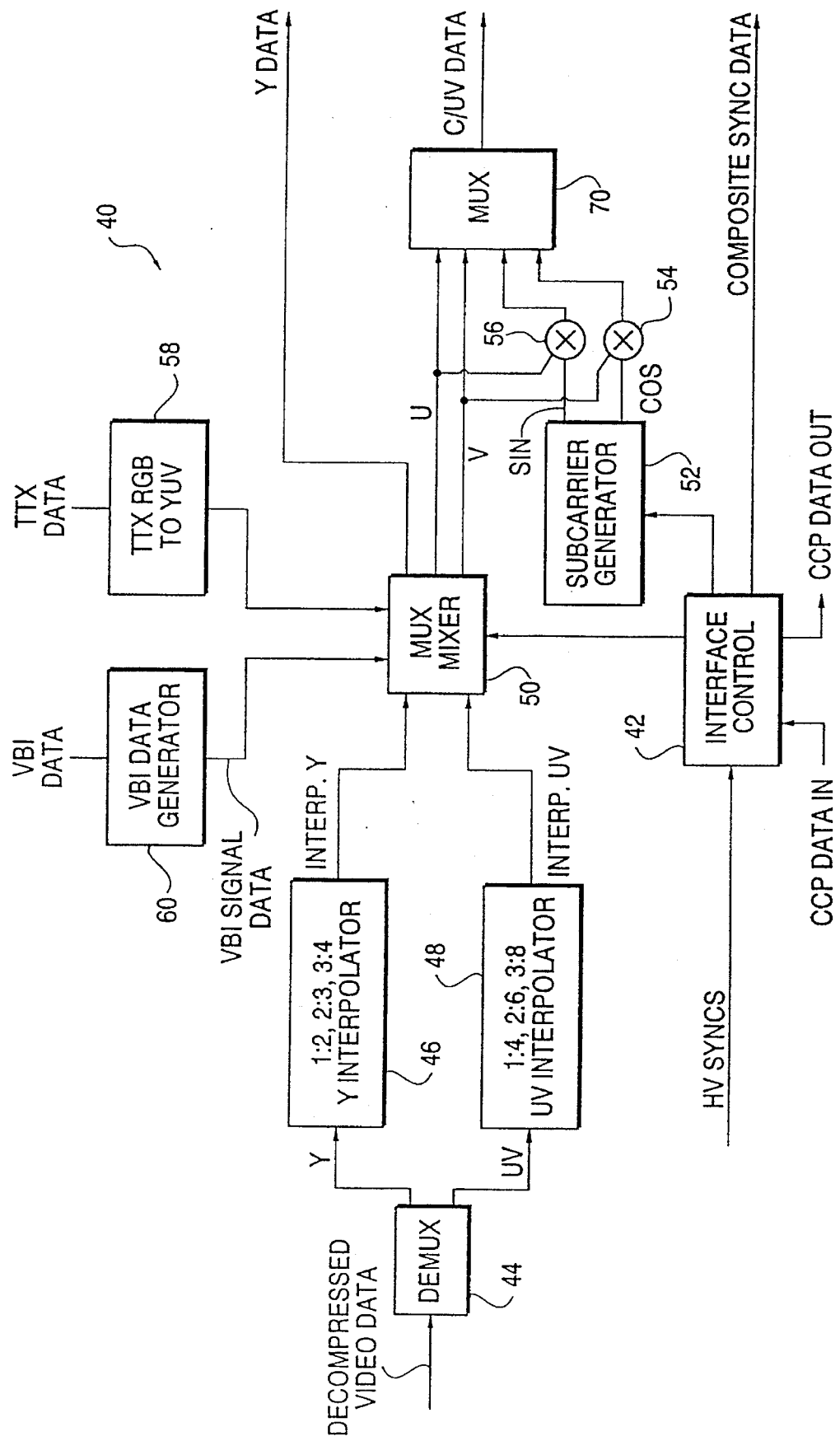
FIG. 3 is a block diagram showing the video interface of the present invention.

In FIG. 3, video interface 40 includes demultiplexer 44 for receiving the decompressed video data from the video process decompressor and separating the data into brightness Y data and color UV data to be fed to interpolators 46, 48, respectively. Video interface 40 includes Y interpolator 46 and UV interpolator 48 for producing interpolated Y and interpolated UV data which is output to multiplex mixer 50. The video interface also includes VBI data generator 60 which receives the VBI data from compression control processor 34 and generates a VBI signal data which is output to the multiplex mixer 50. Preferably, video interface 40 also includes converter 58 for converting RGB text information into YUV text information. The video interface 40 includes an interface control 42 receiving horizontal and vertical synchronization information and input data from the compression control processor and producing output data to the compression control processor and a variety of control signals to control the operation of circuits associated with video interface 40, for example, controlling interpolators 46 and 48, or for example, controlling multiplex mixer 50.

The video interface 40 serves as a video post processor to the video process decompressor, for example, a standard video decompressor based on, for example, MPEG (Moving Picture Expert Group) video standards. Interface circuit 40 receives decompressed video data from the MPEG video decompressor, as a sequence of digitally represented data samples, and outputs composite signal data, also as a sequence of digitally represented data samples, corresponding to standard composite video signals such as NTSC signals or PAL signals. Video interface 40 preferably processes 16-bit YUV data with a 4:2:2 sampling rate as defined by a CCIR 601 standard. Interpolator 46, 48, are preferably designed to support all standard resolutions, for example, 352, 480, 544 and 720 horizontal resolution cells per line. To interpolate, interpolators 46 performs 1:2, 2:3 and 3:4 interpolation on brightness Y data, and UV interpolator performs 1:4, 2:6 and 3:8 interpolation on color data U and color data V. Interface control 42 controls the interpolator multiplexers for passing data in a format which supports all standard frame dimensions, for example, 525 lines per frame and 625 lines per frame.

In video interface 40, multiplex mixer 50 mixes (by multiplexing) interpolated Y data, as a sequence of digitally represented data samples, and interpolated UV data, also as a sequence of digitally represented data samples, from interpolators 46 and 48, respectively, with VBI signal data, also as a sequence of digitally represented data samples, from VBI data generator 60 to output brightness data Y and color difference data U and V as sequences of digitally represented data samples in a frame-based format which includes lines for 10 carrying the VBI signal data. For example, line 21 may be included to carry closed captioning data. Interface control 42 controls the beginning reference of the sampled data sequences so as to correspond with the active video portion of, for example, an NTSC type signal. Color difference data U is provided to a first input of U multiplier 56 and color difference data V is provided to a first input of V multiplier 54. Video interface 40 also includes subcarrier generator 52 controlled by interface control 42 to generate a cosine wave form and a sine wave form corresponding to a predetermined color subcarrier wave form and at a phase and frequency of the subcarrier wave. The sine wave form is supplied to a second input of U multiplier 56 as a sequence of digitally represented data samples and the cosine wave form is supplied to a second input of V multiplier 54 also as a sequence digitally represented data samples. The video interface 40 also includes a final multiplexer 70 to select between either color difference data UV (to output data in a format such as CCIR 601) or the output of U multiplier 56 and V multiplier 54 to output sampled data sequences corresponding to the chroma signal in NTSC composite video, as controlled by interface control 42. Thus, multiplexer 70 provides at its output color video data having encoded therein either color different signal data UV or chroma signal data C. The interface control 42 also produces composite synchronization signals as a sequence of digitally represented data samples.

In particular, control interface 42 controls the timing of the generation of brightness Y data (also referred to as luminance data) and either color difference data UV or chroma data C (i.e., UV data modulated on the cosine and sine wave forms from subcarrier generator 52). The timing of the generation of this data is controlled with respect for the HV synchronization input to control interface 42 so as to coincide with the active video portion of a standard line of composite video data. In a similar way, control interface 42 controls the timing of the generation of the VBI signal data to coincide with the same active video portion. Control interface 42 controls multiplex mixer 50 to selectively switch the VBI signal data (as a sampled data sequence) into the brightness Y and/or color differences UV output of multiplex mixer 50 (also a sampled data sequence). Any particular scan line may be output from the video interface, for example, a sampled data sequence produced in VBI data generator 60 containing closed captioning data may be switched into the brightness Y output of multiplex mixer 50 during the active video portion of scan line 21.

Also, the composite synchronization data, output from interface control 42, is a digitally represented sampled data sequence whose timing with respect to the HV synchronization input to control interface 42 is controlled to complement the brightness Y data output from multiplex mixer 50 so that when combined, the combined digitally represented sampled data sequence will correspond to a standard composite video signal, for example, as defined by EIA RS-170A, thus achieving a digitally represented sampled data sequence corresponding to, for example, a black and white NTSC video signal.

Finally, interface control 42 controls subcarrier generator 52, the U and V outputs of multiplex mixer 50, and final multiplexer 70 to generate chroma data C in order to add color to the black and white NTSC data sequence described above. The timing and IRE levels of the subcarrier generation are controlled to generate the correct phase angle and amplitude for both the chroma burst portion of a color NTSC composite video signal and the color subcarrier wave onto which UV signal data are modulated. The timing of the U and V sampled data sequences output from multiplex mixer 50 and a cosine and sine color subcarrier wave form sampled data sequence is controlled to coincide with the active video portion of the composite video data described above so that the output of multipliers 54, 56 correspond to a modulated chroma signal having color difference signals U and V modulated on the color subcarrier wave form.

It will be appreciated by skilled persons that multiplex mixer 50 can be controlled by interface control 42, in accordance with parameters (e.g. A and B, each of which may be either positive or negative quantities) received from the compression control processor (e.g. through input port CCP IN), to output predetermined constants as outputs U and V during the chroma burst portion of the composite video data so that a precise phase controlled angle and amplitude color subcarrier wave is provided at the output of final mixer 70 during the chroma burst portion, the phase and amplitude color subcarrier wave being $$A*\cos(\omega t)+B*\sin(\omega t).$$

Alternatively, the amplitude of the U and V signal data may be set to zero to eliminate color and produce a black and white picture. Furthermore, skilled persons will appreciate that multiplexer 70 may be designed to include an adder at its C output to add a constant (e.g. K) to its C output and that interface control 42 may control the DC offset of the C output in accordance with a parameter (e.g. K) received from the compression control processor, the offset C output being $$A*\cos(\omega t)+B*\sin(\omega t)+K.$$

Figure 5:
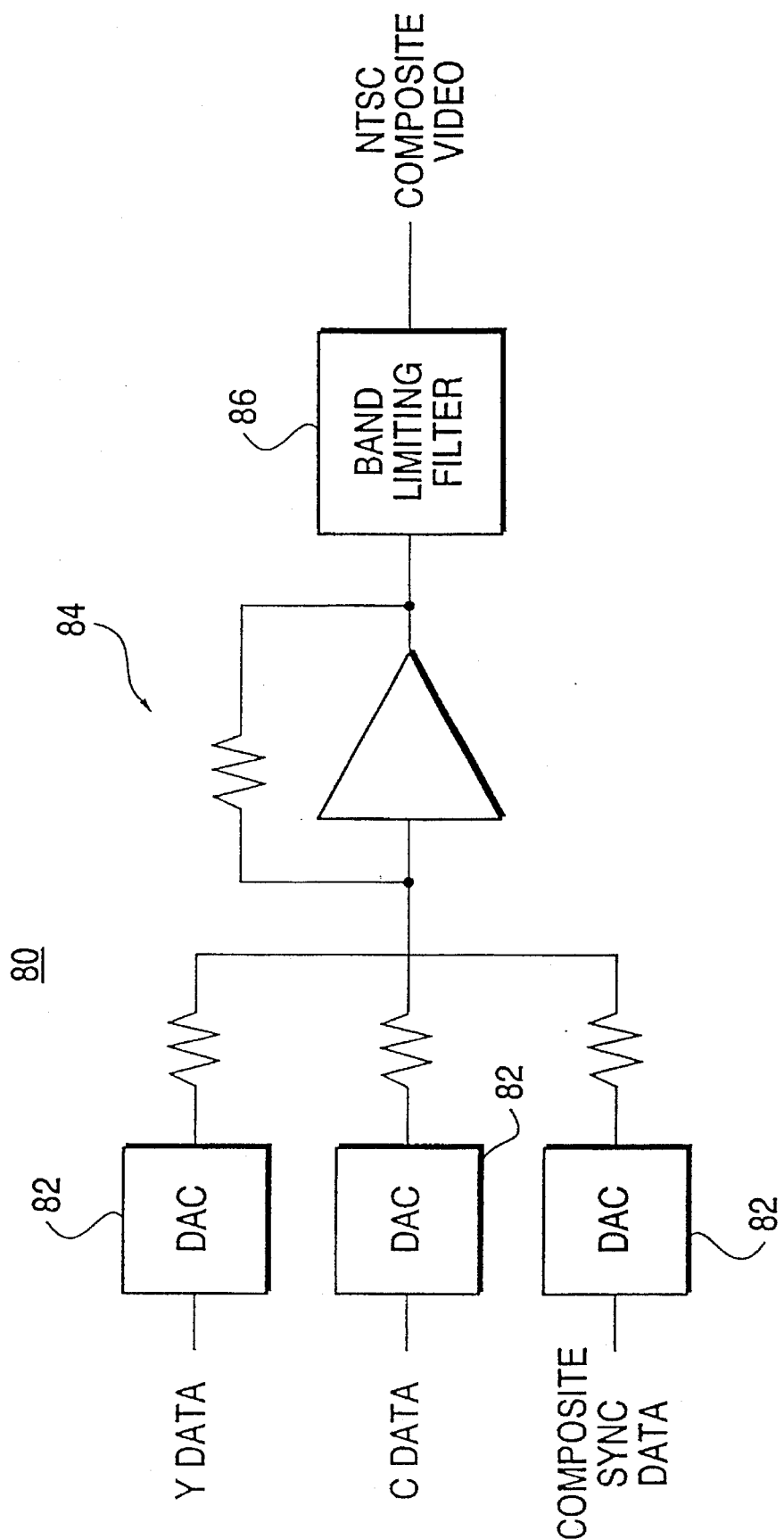
FIG. 5 is a schematic diagram showing a simple combiner exemplary of the present invention.

FIG. 5 shows an example of an exemplary combiner 80 to combine the sample data sequences of brightness Y, chroma C and composite sync data. First the data sample sequences, digitally represented, are converted to analog sampled data sequences in digital to analog converters 82 and then added in a summing amplifier 84 followed by a band limiting filter 86. Obviously, a sampled data sequence is controlled, in multiplex mixer 50, final multiplexer 70 or interface control 42 to be zero whenever the sampled data sequence is not to be added in the combiner. Alternatively, the sampled data sequences may be multiplexed together (for example, with tri-state outputs from 50, 70 and 42) and only one digital to analog converter is used.

Subcarrier generator 52 enables the video interface 40 to generate the necessary modulation for color NTSC signals and PAL signals. The control interface 42 is able to generate the necessary composite synchronization signals for NTSC and PAL signals. VBI data generator 60, multiplex mixer 50 and multiplexer 70 enable VBI data which had been previously encoded in the user data sent over the compressed video data to be regenerated and reinserted into the composite video data.

To generate a composite video signal, a full 720 resolution samples per line is preferred in the composite video data. For input resolutions of 352, 480 and 544 resolution cells, intermediate values are interpolated in interpolators 46, 48 to generate 720 resolution samples in accordance with Table 1.

TABLE 1

| Input Resolution | Y Interpolation | UV Interpolation |
|---|---|---|
| 352 | 1:2 | 1:4 |
| 480 | 2:3 | 2:6 |
| 544 | 3:4 | 3:8 |

For 4:2:2 sampling rates, each of the U and V data is sampled at half the rate of the Y data. Therefore, the number of samples to be interpolated is twice that of the luminance (or brightness data). The interpolator is preferably a 7-tap finite impulse response filter.

It will be appreciated that for an NTSC output, the UV must be scaled, whereas for a (CCIR 601) output, the U and V levels are the same. Thus, the U and V must be scaled relative to each other. V scaling is unchanged and U scaling is scaled by $45/64$ or 0.7015 for NTSC formats.

Interface control 42 also has an input port CCP IN to receive processing commands (e.g. color burst phase, amplitude and DC offset parameters) from the compression control processor and an output port CCP OUT to send timing (e.g. line and field numbers) and status signals to the compression control processor or other circuits requiring timing signals such as line number or field number being processed. Input port CCP IN may, for example, include three terminals: data strobe, data in, and enable data.

Figure 4:
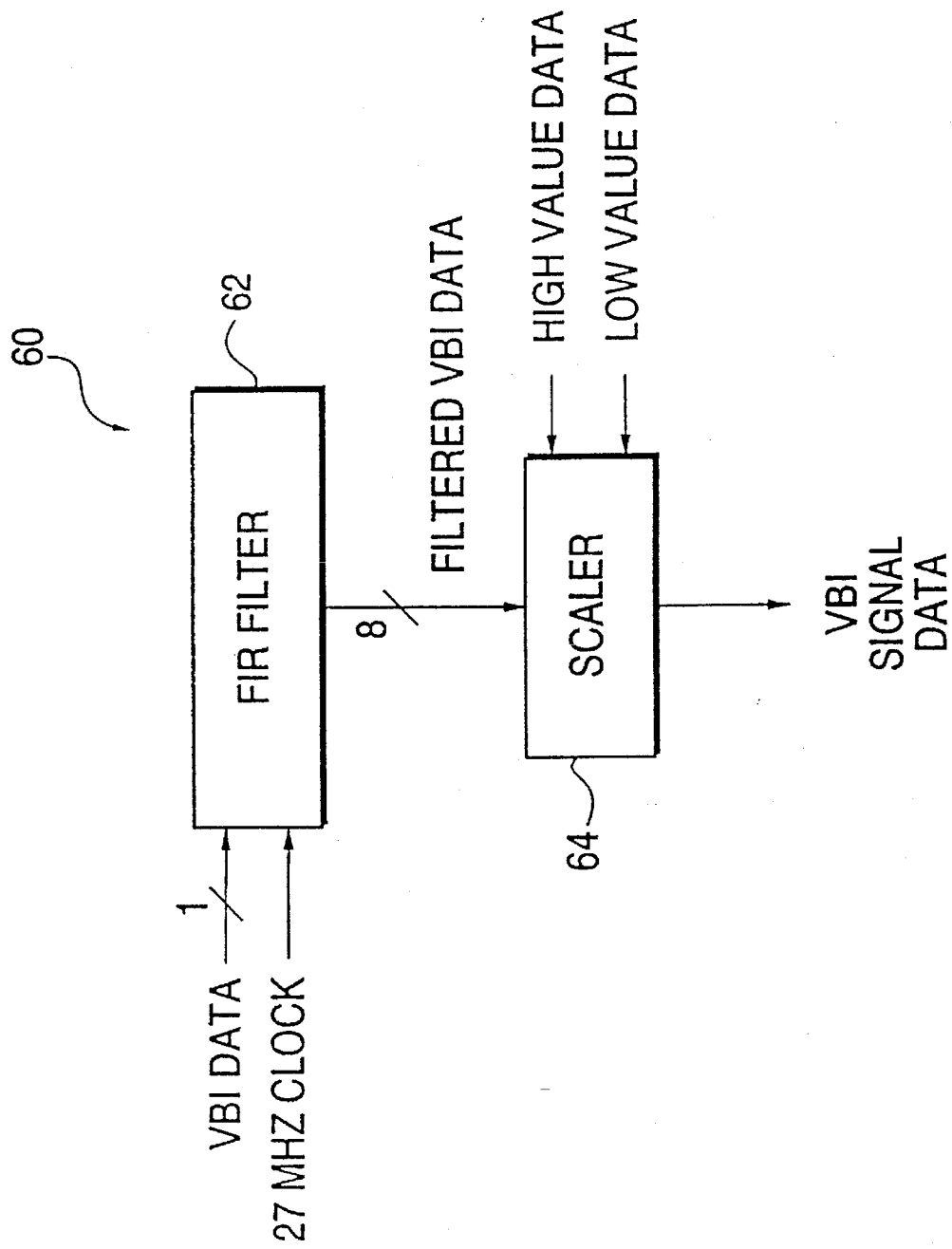
FIG. 4 is an exemplary block diagram showing the VBI data generator of the present invention.

In FIG. 4, VBI data generator 60 includes filter 62 and scaling circuitry 64. The VBI data generator is a general purpose two-level signal generator. The VBI data is sent to the decoder via an MPEG user data stream. The compression control processor pulls the data from the MPEG decompressor and passes the VBI data to video interface 40. The video interface 40 receives the VBI data from the compression control processor at control interface 42 and regenerates the VBI signal data as a sequence of digitally represented data samples in VBI data generator 60. The VBI signal data is preferably regenerated by filtering a one-bit data stream through a filter (for example, a finite impulse response filter) at 27 MHz clock rate. The output of the filter is preferably a data stream with an eight-bit output and a rise and fall time of approximately 500 nanoseconds. Scaling can then be done on the eight-bit data stream to scale the signal to the proper IRE levels in accordance with high level and low level parameters received at control interface 42 from the compressor control processor. The filter is preferably an 11-tap finite impulse response filter, one bit in and eight bits out, with coefficients: 1, 4, 8, 12, 15, 16, 15, 12, 8, 4 and 1, which provide a rise time of approximately 500 nanoseconds.

Standard MPEG decompressors decompress compressed video data and produce decompressed video data and system user data. The system user data may be associated with any layer of the MPEG format, referred to as a layer of the MPEG grammar: video sequence layer, groups of pictures layer, picture layer and slice layer. The MPEG decompressor tags the user data with a code to indicate the layer with which the user data is associated. Preferably VBI data is encoded in user data associated with the picture layer. Therefore, the decompression control processor scans through all user data received to cull out those user data packets associated with the picture layer and then further scans the user data associated with picture layers to cull out those user data packets identified as containing VBI data, for example, closed captioning data, although any form of data may be transferred in this way.

For example, the user data may contain phase, amplitude and DC offset parameters of the color subcarrier associated with a particular picture. This is especially useful when the color subcarrier in the particular video data stream is unusual or abnormal in that its color subcarrier is characterized by an unexpected phase, amplitude or DC offset.

Standard MPEG decompressors also decompress compressed audio data. A television-type data stream will contain both video and audio data streams. In an alternative embodiment, the VBI data, for example, line 21 closed captioning data, may be encoded in user data associated with the audio data stream. This has some advantages in a multilingual environment. An English language television type data stream being transported into a French-speaking household having a deaf family member may preferably have both a French language audio data stream and associated therewith a French language line 21 closed captioning data stream. Alternatively, an English language television-type data stream being broadcast into a dual language speaking area may preferably have an English language audio data stream with French subtitles being broadcast in the line 21 closed captioning data stream, or vice versa. This might also prove to be a popular way to teach a foreign language.

In one embodiment the VBI data is preferably transmitted in a 256 bit user data packet associated with the video data stream (picture level) of an industry standard format such as the MPEG standard. The VBI data can be transmitted in either the video data stream or the associated audio data stream. The compression control processor reads the VBI data from the video process decompressor and passes the VBI data to the video interface. The data includes VBI header data, for example, in accordance with Table 2. Skilled persons will appreciate that phase, amplitude and DC offset parameters for the color subcarrier wave form, as discussed above, may also be encoded in the VBI header data in order to precisely control generation of color wave forms as discussed above.

TABLE 2

| Data Field | Field Size |
|---|---|
| Packet ID | 8 bits |
| Line Numbers | 5 bits |
| Field Odd/Even | 1 bit |
| Spare | 2 bits |
| Data High Value | 8 bits |
| Data Low Value | 8 bits |
| Symbol Width (27 MHz clock counts) | 8 bits |
| # Data Symbols | 8 bits |
| Data | 0–208 bits |

Many different data types are presently transmitted in the active video portion of scanning lines in the vertical blanking interval of an NTSC composite video signal. 47 C.F.R. Ch. I, Section 73.682(21)–(23) provides for transmitting test signals, cue and control signals, and identification signals in lines 17–20, telecommunication signals on lines 10–18 and 12, and closed captioning data on line 21. In addition, all lines authorized for telecommunications transmissions may be used for other purposes upon approval of the F.C.C. Each different type of data transmission in the vertical blanking interval may have specifically defined data encoding standards such as IRE levels, bit data rate and bit rise/fall time. The present invention recognizes these specific requirements and provides for more than the mere transmission of the data bits. In the header portion of the VBI data, the present invention provides for the bit rate by defining the symbol width (e.g., bit width for closed captioning data) in terms of 27 MHz clock counts; provides for IRE level of the high bit level and low bit level in terms data high and low values and defines the scanning line number in terms of line and field number.

For example, line 21 closed captioning data includes a RUN IN sine wave and 16 bits of data (16 symbols designated A-P) usually organized into two 7-bit bytes plus one parity bit per byte. The number of bits or equivalent for RUN IN in a line 21 signal needs to be 32, or the data rate needs to be 32 times the horizontal line scan rate fH (i.e., 32 fH). To generate a signal having a symbol data rate of 32 fH requires a symbol transfer and sampling rate of 64 fH due to Nyquist's sampling theorem. For NTSC signals, the number of samples per line may be 858 fH (at 13.5 MHz samples) or 1716 fH (at 27 MHz samples). Thus, with the 1716 samples which may be taken across line 21, the closed captioning data requiring 64 fHz samples per line, then the width of the closed captioning data symbols (e.g., sample bits) which may be regenerated in line 21 is 1716 samples per line divided by 64 samples per line or about 27 samples per symbol, the symbol width. The VBI data packet for closed captioning data should have its header set so that line 21 is specified, symbol width should be specified at 27, 27 MHz clocks, the number of symbols at 64. Appropriate high and low data levels are also specified. The 64 symbols to generate the RUN IN and bits A–P are:

1010101010000AABBCCDDEEFFGGHHIIJJKKLLMMNNOOPP.

Similarly, other VBI data may be stripped off analog signals at the encoder end and reconstructed at the decoder end including such data as SMPTE time code on line 15 and Nielson station identification code on line 20 or 22.

Some of the data to be sent, such as sampled VITS (e.g. including a sequence of 8 bit digitally represented 13.5 MHz data samples), may be repetitive wide bandwidth data which cannot be completely sent in the active video portion of a single scanning line. In such a case, the VITS signal may be undersampled (e.g., every Nth Nyquist sample) at the encoder end and in the user data packet associated with the first picture frame. Then, the VITS signal is again undersampled (every Nth Nyquist sample) but time shifted by one sample, then encoded in a user data packet associated with second picture frame. This process is again repeated for the third through Nth picture frames until a fully sampled VITS signal is transferred. At the decoder, each user data packet is decoded and saved until all picture frames are received and the undersampled data from the user data packets associated with all picture frames is combined to reconstruct the VITS signal. Thus, the MPEG standard formats can be used to transfer the repetitive wide bandwidth VBI signals in the original signal provided by a programmer service.

In the system disclosed in U.S. Patent application Ser. No. 08/006,476, closed captioning data is separated from the analog NTSC video signal provided by a video service programmer and encoded into the last bit of the fourth byte of the bits that constitute a line in the digital frame format which is therein disclosed. The digital frames of data are transmitted from encoder to decoder. At the decoder, a demultiplexer separates the closed captioning data from video data, and a video board regenerates the closed captioned data as an analog signal, converts the video data into an analog signal, and inserts the regenerated analog closed captioning signal in line 21 of the analog video signal.

In the present invention, the closed captioning data is encoded in user data defined by MPEG standards or equivalent, in contrast to being encoded into the data of a video frame as disclosed in U.S. Patent application Ser. No. 08/006,476. Circuits are provided by industrial sources to decompress and associate the video, audio and user data according to industry-wide MPEG standards.

In the present invention, a compression control processor is controlled to cull the closed captioning data out of the MPEG user data and output the closed captioning data to the video interface of the present invention. It should be obvious to persons skilled in this art that other types of ancillary data, such as other types of VBI data normally encoded in scan lines sent during the vertical blanking interval, may be substituted for the closed captioning data and will hereafter be referred to as VBI data.

In another embodiment the user data packet has encoded therein a Pan-scan code. In video data streams based on an MPEG1 standard, a 16:9 aspect ratio formatted picture may be transmitted; however, when the decoder produces video signals for a 4:3 aspect ratio format display device or television only a center portion of the 16:9 aspect ratio formatted picture may be displayed. The Pan-scan code defines the offset from which the 4:3 aspect ratio formatted picture is to be extracted. In this embodiment the Pan-scan offset code is preferably encoded in the user data packet associated with the picture layer of the video data. In the decoder, the MPEG1 decompressor provides the user data to the compression control processor and the compression control processor decodes the user data and provides the Pan-scan offset codes to control interface 42 of video interface 40.

The video interface 40 is preferably manufactured as a single integrated circuit.

It will be appreciated by those skilled in the art that changes could be made to the embodiments described above without departing from the broad inventive concepts thereof. It is understood, therefore, that this invention is not limited to the particular embodiments disclosed, but is intended to cover all modifications which are within the scope and spirit of the invention as defined by the appended claims.

What is claimed is:

1. In a video system for processing compressed video data into composite video data, the composite video dam corresponding to a standard composite video signal type selected from a plurality of standard types, the plurality of standard types including at least one of an NTSC composite video signal type and a PAL video signal type, the video system including a processor and a standard video decompressor to process the compressed video data into decompressed video data and user data, the user data having VBI data encoded therein, the processor culling the VBI data from the user dam, a video interface to process the decompressed video data and the VBI dam into the composite video data, the composite video data having the VBI data encoded therein, the video interface comprising:

a VBI data generator to process the VBI data into VBI signal data;

a mixer coupled to the video decompressor to receive the decompressed video dam, the mixer being coupled to the VBI data generator to receive the VBI signal data, the mixer providing output Y, U and V data during an active video portion of a scan line; and circuitry to process the Y, U and V data into the composite video data.

2. The video interface of claim 1, wherein the VBI data generator includes circuitry to receive the VBI data from the processor and generate the VBI signal data according to the VBI data, the VBI data including at least one of packet ID data, line number data, odd/even field data, high value data, low value data, symbol width data, number of symbols data and symbol data.

3. The video interface of claim 2, wherein the circuitry of the VBI data generator comprises:

a filter to process the symbol data into the filtered VBI data; and circuitry to amplitude scale the filtered VBI data to become the VBI signal data based on the high value data and the low value data.

4. The video interface of claim 2, wherein the circuitry of the VBI data generator comprises circuitry to time scale a symbol rate of the VBI signal data based on the symbol width data.

5. The video interface of claim 2, wherein the VBI signal dam includes a sequence of digitally represented sampled data corresponding to an analog line signal to be regenerated in an active portion of a scanning line in a vertical blanking interval of the standard composite video signal.

6. The video interface of claim 5, wherein the analog line signal is a closed captioning signal.

7. The video interface of claim 5, wherein the analog line signal is a station ID signal.

8. The video interface of claim 5, wherein the analog line signal is a time code signal.

9. The video interface of claim 5, wherein the analog line signal is an undersampled VITS signal.

10. The video interface of claim 9, wherein the undersampled VITS signal is one undersampled signal of a plurality of undersampled VITS signals, the analog line signal being reconstructable from the plurality of undersampled VITS signals, each undersampled signal of the plurality of undersampled VITS signals corresponding to VITS signal data, the plurality of undersampled VITS signals corresponding to a set of VITS signal data, each VITS signal date of the set of VITS signal data being associated with a respective video frame, the video interface further including a line store memory to save the set of VITS signal data and circuitry to reconstruct the analog line signal from the set of VITS signal data.

11. In a video system for processing compressed video data into composite video data, the composite video data corresponding to a standard composite video signal type selected from a plurality of standard types, the plurality of standard types including at least one of an NTSC composite video signal type and a PAL video signal type, the video system including a processor and a standard video decompressor to process the compressed video data into decompressed video data and user data, the user data having color burst parameters encoded therein, the processor culling the color burst parameters from the user data, a video interface to process the decompressed video data and the color burst data into the composite video data, the video interface comprising:

a subcarrier data generator to generate sine data and cosine data;

a first multiplier to process sine data into scaled sine data based on a function of a first parameter of the color burst parameters from the processor;

a second multiplier to process cosine data into scaled cosine data based on a function of a second parameter of the color burst parameters from the processor;

a mixer to combine the scaled sine data and the scaled cosine data, the mixer generating color burst portion data of the composite video data; and means for combining the color burst portion data with the decompressed video data to form the composite video data.

12. In a video system for processing compressed video data into composite video data, the composite video data corresponding to a standard composite video signal type selected from a plurality of standard types, the plurality of standard types including at least one of an NTSC composite video signal type and a PAL video signal type, the video system including a processor and a standard video decompressor to process the compressed video data into decompressed video data and user data, the user data having pan-scan data encoded therein, the pan-scan data defining a sub-portion of an active video portion of the decompressed video data, the processor culling the pan-scan data from the user data, a video interface to process the decompressed video data and the pan-Scan data into the composite video data, the video interface comprising:

a mixer coupled to the video decompressor to receive the decompressed video data, the mixer providing output Y, U and V data during the sub-portion of the active video portion of a scan line according to the pan-scan data; and circuitry to process the Y, U and V data into the composite video data.

13. The video interface of claim 11, wherein:

the user data further includes VBI (vertical blanking interval) data;

the processor culls the VBI data from the user data;

the means for combining includes a VBI data generator to process the VBI data into VBI signal data;

the means for combining further includes a VBI mixer coupled to the video decompressor to receive the decompressed video data, the VBI mixer being coupled to the VBI data generator to receive the VBI signal data, the VBI mixer providing output Y, U and V data during an active video portion of a scan line and providing the output U and V data as the first and second parameters during a non-active video portion of the scan line.

14. The video interface of claim 13, wherein the VBI data generator includes circuitry to receive the VBI data from the processor and generate the VBI signal data according to the VBI data, the VBI data including at least one of packet ID data, line number data, odd/even field data, high value data, low value data, symbol width data, number of symbols data and symbol data.

15. The video interface of claim 14, wherein the circuitry of the VBI data generator comprises:

a filter to process the symbol data into the filtered VBI data; and circuitry to amplitude scale the filtered VBI data to become the VBI signal data based on the high value data and the low value data.

16. The video interface of claim 14, wherein the circuitry of the VBI data generator comprises circuitry to time scale a symbol rate of the VBI signal data based on the symbol width data.

17. The video interface of claim 14, wherein the VBI signal data includes a sequence of digitally represented sampled data corresponding to an analog line signal to be regenerated in an active portion of a scanning line in a vertical blanking interval of the standard composite video signal.

18. The video interface of claim 12, wherein:

the user data further includes VBI (vertical blanking interval) data;

the processor culls the VBI data from the user data; the video interface further comprises a VBI data generator to process the VBI data into VBI signal data; and the mixer is coupled to the VBI data generator to receive the VBI signal data, the mixer providing the VBI signal dam as the output Y, U and V data during an active video portion of a scan line during the vertical blanking interval.

19. The video interface of claim 18, wherein the VBI data generator includes circuitry to receive the VBI data from the processor and generate the VBI signal data according to the VBI data, the VBI data including at least one of packet ID data, line number data, odd/even field data, high value data, low value data, symbol width data, number of symbols data and symbol 20. The video interface of claim 19, wherein the circuitry of the VBI data generator comprises:

a filter to process the symbol data into the filtered VBI data; and circuitry to amplitude scale the filtered VBI data to become the VBI signal data based on the high value data and the low value data.

* * * * *

UNITED STATES PATENT AND TRADEMARK OFFICE
CERTIFICATE OF CORRECTION

PATENT NO. : 5,493,339
DATED : February 20, 1996
INVENTOR(S) : Christopher H. Birch, et al.

It is certified that error appears in the above-indentified patent and that said Letters Patent is hereby corrected as shown below:

```
Column 1, line 12, delete "08/160,841", insert --08/161,160--;
         line 16, delete "and", insert --as--.

Col. 19 Claim 1, line 2, delete "dam", insert --data--;
                 line 9, after "VBI", insert --(vertical blanking interval)--;
                 line 11, delete "dam", insert --data--;
                 line 12, delete "dam", insert --data--;
                 line 18, delete "dam", insert --data--.

Col. 20 Claim 5, line 2, delete "dam", insert --data--.
```

Signed and Sealed this

Fourth Day of June, 1996

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,493,339
DATED : February 20, 1996
INVENTOR(S) : Christopher H. Birch, et. al.

It is certified that error appears in the above-identified patent and that said Letters Patent is hereby corrected as shown below:

Col. 22, line 27, delete "dam" and insert --data--

Col. 22, line 36, after "symbol" insert --data.--

Signed and Sealed this

Ninth Day of February, 1999

Attest:

Attesting Officer

*Acting Commissioner of Patents and Trademarks*